(12) United States Patent
Hwang et al.

(10) Patent No.: US 11,304,104 B2
(45) Date of Patent: Apr. 12, 2022

(54) DEVICE AND METHOD FOR PERFORMING HANDOVER IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/946,573

(22) Filed: Jun. 26, 2020

(65) Prior Publication Data

US 2020/0413308 A1    Dec. 31, 2020

(30) Foreign Application Priority Data

Jun. 28, 2019 (KR) ........................ 10-2019-0078031

(51) Int. Cl.
*H04W 4/00* (2018.01)
*H04W 36/00* (2009.01)
(Continued)

(52) U.S. Cl.
CPC ... *H04W 36/0085* (2018.08); *H04W 36/0058* (2018.08); *H04W 36/00835* (2018.08);
(Continued)

(58) Field of Classification Search
CPC ......... H04W 36/0058; H04W 36/0061; H04W 36/0083; H04W 36/00835;
(Continued)

(56) References Cited

U.S. PATENT DOCUMENTS

2014/0126545 A1    5/2014   Tamura et al.
2019/0101615 A1    4/2019   Tenny
(Continued)

OTHER PUBLICATIONS

International Search Report and Written Opinion of the International Searching Authority in connection with International Application No. PCT/KR2020/008387 dated Oct. 15, 2020, 9 pages.
(Continued)

*Primary Examiner* — Matthew W Genack

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to embodiments, a method performed by a user equipment (UE) in a wireless communication system, the method comprises: receiving, from a base station, a radio resource control (RRC) reconfiguration message including conditional configuration information, wherein the conditional configuration information includes: identification information for a candidate cell; and a configuration of the candidate cell; and performing one or more operations for a conditional handover based on RRC reconfiguration message.

16 Claims, 26 Drawing Sheets

(51) Int. Cl.
*H04W 76/30* (2018.01)
*H04W 76/27* (2018.01)

(52) U.S. Cl.
CPC ..... *H04W 36/00837* (2018.08); *H04W 76/27* (2018.02); *H04W 76/30* (2018.02)

(58) Field of Classification Search
CPC ....... H04W 36/00837; H04W 36/0085; H04W 76/27; H04W 76/30
See application file for complete search history.

(56) References Cited

U.S. PATENT DOCUMENTS

| | | | | |
|---|---|---|---|---|
| 2019/0261240 | A1* | 8/2019 | Fang | H04W 28/0268 |
| 2020/0396658 | A1* | 12/2020 | Szilagyi | H04W 36/0083 |
| 2021/0120458 | A1* | 4/2021 | Koskela | H04W 36/0016 |

OTHER PUBLICATIONS

China Telecom, "Reconfiguration and deconfiguration of CHO," R2-1907139, 3GPP TSG-RAN WG2 Meeting #106, Reno, USA, May 13-17, 2019, 2 pages.
Ericsson, "TP to 38.300 on Conditional Handover in NR," R2-1906219, 3GPP TSG RAN WG2 #106, Reno, US, May 13-17, 2019, 4 pages.
LG Electronics Inc., "Consideration on CHO De-configuration and Failure," R2-1905098, 3GPP TSG-RAN WG2 Meeting #105bis, Xi'an, China, Apr. 8-12, 2019, 3 pages.
Qualcomm Incorporated, "LTE Conditional HO design considerations," R2-1906375 Revision of R2-1904662, 3GPP TSG-RAN WG2 Meeting #106, Reno, USA, May 13-17, 2019, 8 pages.

* cited by examiner

DEVICE AND METHOD FOR PERFORMING HANDOVER IN WIRELESS COMMUNICATION SYSTEM

CROSS-REFERENCE TO RELATED APPLICATION

This application is based on and claims priority under 35 U.S.C. 119 to Korean Patent Application No. 10-2019-0078031, filed on Jun. 28, 2019, in the Korean Intellectual Property Office, the disclosure of which is herein incorporated by reference in its entirety.

BACKGROUND

1. Field

The disclosure generally relates to a wireless communication system and, more particularly, to a device and method for performing a handover in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A terminal may perform communication via a base station in a wireless communication system. A cell that provides a service to the terminal from among cells of the base station may be referred to as a serving cell. However, since the terminal may move, the quality of the service from the serving cell may deteriorate according to the moving of the terminal, and in the case where the quality of the service from the serving cell deteriorates or a channel quality for an adjacent cell is improved, a handover from the serving cell of the terminal to the adjacent cell may be required.

The above information is presented as background information only to assist with an understanding of the disclosure. No determination has been made, and no assertion is made, as to whether any of the above might be applicable as prior art with regard to the disclosure.

SUMMARY

Based on the foregoing discussion, the disclosure provides a device and method for performing a handover in a wireless communication system.

The disclosure may provide the device and method for configuring a candidate target cell when performing a conditional handover (CHO) in the wireless communication system.

The disclosure provides the device and method for managing candidate cell configurations by using a candidate cell ID of a candidate cell for CHO in the wireless communication system.

The disclosure provides the device and method for performing signaling based on an applicability check for the candidate cell configurations in the wireless communication system.

According to embodiments, a method performed by a user equipment (UE) in a wireless communication system, the method comprises: receiving, from a base station, a radio resource control (RRC) reconfiguration message including conditional configuration information, and a configuration of the candidate cell; and performing one or more operations for a conditional handover based on RRC reconfiguration message. The conditional configuration information includes: identification information for a candidate cell.

According to embodiments, a method performed by a base station in a wireless communication system, comprises generating a radio resource control (RRC) reconfiguration message including conditional configuration information, wherein the conditional configuration information includes: identification information for a candidate cell; and a configuration of the candidate cell; and transmitting, to a user equipment (UE), a radio resource control (RRC) reconfiguration message for a conditional handover.

According to embodiments, a user equipment (UE) in a wireless communication system, comprising: at least one transceiver; and at least one processor configured to: receive, from a base station via the at least one transceiver, a radio resource control (RRC) reconfiguration message including conditional configuration information; and perform one or more operations for a conditional handover based on RRC reconfiguration message. The conditional configuration information includes: identification information for a candidate cell; and a configuration of the candidate cell.

According to embodiments, a base station in a wireless communication system, comprises at least one transceiver; and at least one processor configured to generate a radio resource control (RRC) reconfiguration message including conditional configuration information, wherein the conditional configuration information includes: identification information for a candidate cell; and a configuration of the candidate cell; and transmit, to a user equipment (UE) via the at least one transceiver, a radio resource control (RRC) reconfiguration message for a conditional handover.

According to embodiments, an operation method of a terminal in a wireless communication system may include: receiving candidate cell configurations for one or more candidate cells for a conditional handover (CHO) from a base station; identifying a candidate cell identifier (ID) for each candidate cell in the candidate cell configurations; and on the basis of the candidate cell ID, updating a candidate cell configuration corresponding to the candidate cell ID to a list of candidate cell configurations, which is stored in the terminal, wherein the candidate cell ID may be generated based on at least one of an ID of the base station or a cell ID of a candidate cell.

According to embodiments, an operation method of a base station in a wireless communication system may include: on the basis of at least one of an identifier (ID) of the base station or a cell ID of a candidate cell for a conditional handover (CHO), generating a candidate cell ID of the candidate cell; and transmitting, to a terminal, a candidate cell configuration including at least one of the candidate cell ID, a CHO configuration, or a CHO trigger condition, wherein at least one of the CHO configuration or the CHO trigger condition is received from an adjacent base station related to the candidate cell via a handover acknowledgment message for a handover request.

According to embodiments, a terminal in a wireless communication system may include: a transceiver configured to receive candidate cell configurations for one or more candidate cells for a conditional handover (CHO) from a base station; and at least one processor configured to identify a candidate cell identifier (ID) for each candidate cell in the candidate cell configurations, and update, based on the candidate cell ID, a candidate cell configuration corresponding to the candidate cell ID to a list of candidate cell configurations, which is stored in the terminal. The candidate cell ID may be generated based on at least one of an ID of the base station or an ID of a candidate cell.

According to embodiments, a base station in a wireless communication system may include: at least one processor configured to, based on at least one of an identifier (ID) of the base station or a cell ID of a candidate cell for a conditional handover (CHO), generate a candidate cell ID of the candidate cell; and a transceiver configured to transmit, to a terminal, a candidate cell configuration including at least one of the candidate cell ID, a CHO configuration, or a CHO trigger condition, wherein at least one of the CHO configuration or the CHO trigger condition is received from an adjacent base station related to the candidate cell via a handover acknowledgment message for a handover request.

A device and method according to embodiments can reduce signaling overhead by instructing a change of a candidate cell configuration on the basis of a candidate cell identifier (ID).

The device and method according to embodiments can increase a handover success rate by notifying a network of a candidate cell ID of a candidate cell for which an applicability check has failed, and performing a CHO for a candidate cell for which an applicability check has been successfully performed.

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

It is an aim of certain embodiments of the invention to solve, mitigate or obviate, at least partly, at least one of the problems and/or disadvantages associated with the prior art. Certain embodiments aim to provide at least one of the advantages described below.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
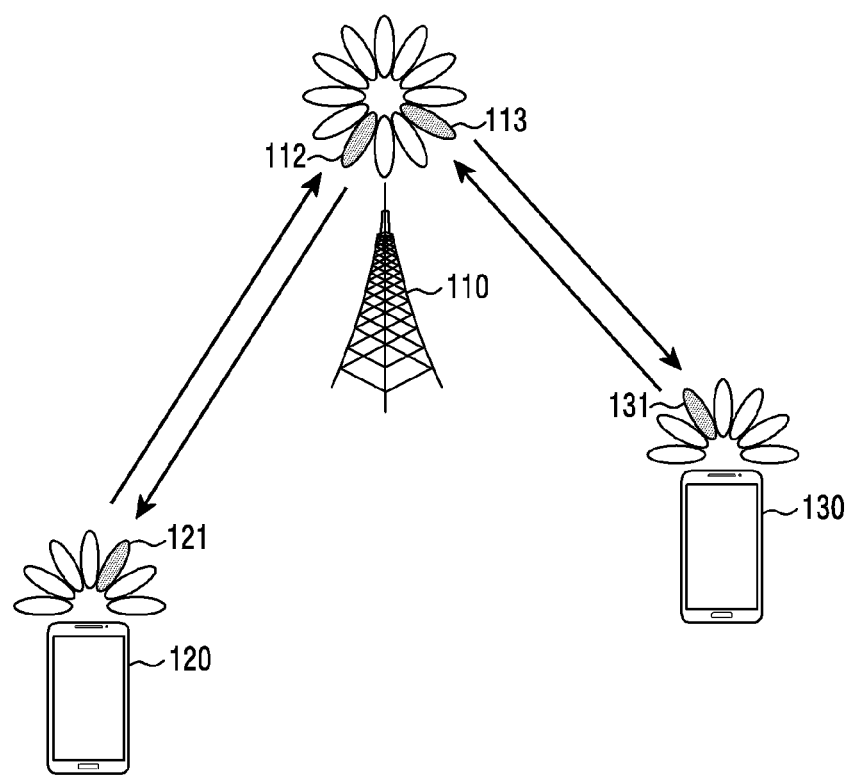
FIG. 1 illustrates a wireless communication system according to various embodiments.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, various embodiments provide a device and method for performing a handover in a wireless communication system. More specifically, various embodiments provide the device and method for performing a conditional handover (CHO) in the wireless communication system. In various embodiments, the CHO may refer to selecting one target cell from among candidate cells that satisfy a CHO trigger condition and performing a handover to the selected target cell, by a terminal.

Hereinafter, terms referring to a signal to be used, terms referring to a channel, terms referring to control information, terms referring to network entities, terms referring to elements of a device, and the like are illustrated for convenience of explanation. Therefore, the disclosure is not limited to the terms described below, and other terms having equivalent technical meanings may be used.

The disclosure describes various embodiments by using terms used in some communication specifications (e.g., 3rd generation partnership project (3GPP)), but this is merely illustrative. Various embodiments may also be easily modified and applied to other communication systems.

In particular, the disclosure may be applied to 3GPP new radio (NR), or 5th generation (5G) mobile communication standards. The disclosure may be applied to intelligent services (for example, smart homes, smart buildings, smart cities, smart cars or connected cars, health care, digital education, retail business, security and safety-related services, etc.) on the basis of a 5G communication technology and an Internet of things (IoT)-related technology.

A wireless communication system has moved away from providing early voice-oriented services, and advances in broadband wireless communication systems that provide high-speed and high-quality packet data services, such as communication standards, for example, 3GPP's high speed packet access (HSPA), long term evolution (LTE) or evolved universal terrestrial radio access (E-UTRA), LTE-advanced (LTE-A), LTE-Pro, 3GPP2's high rate packet data (HRPD), ultra-mobile broadband (UMB), IEEE's 802.16e, and the like.

As a representative example of a broadband wireless communication system, an LTE system adopts an orthogonal frequency division multiplexing (OFDM) scheme as a multiple access scheme in a downlink (DL), and adopts a single carrier frequency division multiple access (SC-FDMA) scheme and/or an OFDM scheme as a multiple access scheme in an uplink (UL). Uplink refers to a wireless link via which a terminal (user equipment (e.g., UE) or a mobile station (MS) transmits data or a control signal to a base station (BS) (e.g., eNodeB), and downlink refers to a wireless link via which a base station transmits data or a control signal to a terminal. In such a multiple-access scheme, data or control information of each user may be distinguished by assigning and operating time-frequency resources, at which data or control information of each user is transmitted, so as not to overlap each other, that is, to establish orthogonality.

A 5G communication system, as a future communication system after LTE, should be able to freely reflect various requirements of users and service providers, so that the 5G communication system should be able to support services that simultaneously satisfy various requirements. For example, services considered for the 5G communication system may include an enhanced mobile broadband (eMBB), massive machine type communication (mMTC), and ultra-reliability low latency communication.

According to an embodiment, the eMBB may aim to provide a data transmission rate that is further improved than a data transmission rate supported by existing LTE, LTE-A, or LTE-Pro. For example, in the 5G communication system, an eMBB should be able to provide a maximum data rate of 20 Gbps in a downlink and a maximum data rate of 10 Gbps in an uplink from the perspective of one base station. The 5G communication system may need to provide a maximum transmission rate while providing an increased actual perceived data rate (user perceived data rate) of a terminal. In order to satisfy these requirements, in the 5G communication system, improvement of various transmission/reception technologies including a more advanced multi-input multi-output (MIMO) transmission technology may be required. In addition, in a band of 2 GHz used by current LTE, a signal is transmitted using a maximum transmission bandwidth of 20 MHz, whereas, in the 5G communication system, a data transmission rate, which is required by the 5G communication system, may be satisfied by using a frequency bandwidth wider than 20 MHz in a frequency band of 3 to 6 GHz or 6 GHz or higher.

At the same time, mMTC is being considered to support application services, such as the Internet of Things (IoT), in the 5G communication system. In order to efficiently provide the Internet of Things, mMTC may require support for large-scale terminal access in a cell, improved coverage of the terminal, an improved battery time, and a reduced cost of the terminal. In the Internet of Things, since terminals are attached to various sensors and various devices to provide communication functions, the Internet of Things should be able to support a large number of terminals (e.g., 1,000,000 terminals/km2) in a cell. Due to the nature of a service, a terminal that supports mMTC is likely to be located in a shaded area that cannot be covered by a cell, such as the basement of a building, and therefore a wider coverage may be required in mMTC compared to other services provided by the 5G communication system. The terminal that supports mMTC may be required to be a low-cost terminal, and since it is difficult to frequently exchange a battery of the terminal, a very long battery life time, such as 10 to 15 years, may be required in mMTC.

Finally, URLLC is a cellular-based wireless communication service used for mission-critical purposes, and may include a remote control for a robot or machinery, industrial automation, an unmanned aerial vehicle, remote health care, and an emergency alert. Therefore, communication provided by URLLC may need to provide a very low latency (ultra-low latency) and a very high reliability (super reliability). For example, a service that supports URLLC should satisfy an air interface latency less than 0.5 milliseconds, and at the same time, may have a requirement of a packet error rate of 10-5 or less. Therefore, for the service that supports URLLC, the 5G system should provide a transmission time interval (TTI) smaller than that of other services, and at the same time, in order to secure the reliability of a communication link, a design requirement that a wide resource should be allocated in a frequency band may be required in the 5G system.

Three services considered in the above-mentioned 5G communication system, which are eMBB, URLLC, and mMTC, may be multiplexed and provided in one system. At this time, different transmission/reception techniques and transmission/reception parameters may be used between services to satisfy different requirements of respective services. However, the above-described mMTC, URLLC, and eMBB are merely examples of different service types, and service types to which the disclosure is applied are not limited to the above-described examples.

Hereinafter, embodiments are described as an example of an LTE, LTE-A, LTE Pro, or 5G (or NR or next-generation mobile communication) system, but embodiments may be applied to other communication systems having a similar technical background or channel type. Further, embodiments may be applied to other communication systems via some modifications without departing from the scope of the disclosure, according to determination by those skilled in the art.

Definitions of terms used in various embodiments are as follows.

A "CHO candidate cell" refers to a candidate cell that may be a target cell of CHO. In various embodiments, the "CHO candidate cell" may be referred to as a "candidate cell" or a "candidate target cell".

A "candidate cell configuration" or a "CHO candidate cell configuration" may be defined for each candidate cell and may include one or more CHO-related configurations for each candidate cell. For example, the candidate cell configuration may include at least one of a CHO candidate cell ID for each candidate cell, a CHO configuration for each candidate cell, or a CHO trigger condition for each candidate cell.

A "CHO candidate cell ID" refers to an ID of a CHO candidate cell.

A "CHO configuration" or "CHO configuration information" refers to configuration information related to CHO. In various embodiments, the CHO configuration may include a resource configuration for CHO.

A "CHO trigger condition for a candidate cell" refers to a condition to trigger a CHO to a corresponding candidate cell.

A term "SpCell" refers to a primary cell (PCell) or a primary secondary cell (PSCell). For Dual Connectivity operation the term Special Cell refers to the PCell of the master cell group (MCG) or the PSCell of the secondary cell group (SCG) depending on if the MAC entity is associated to the MCG or the SCG, respectively. Otherwise the term Special Cell refers to the PCell.

An operation "update" refers to a replacement of a previous one with a new one.

An "applicability check for configuration/reconfiguration" refers to check whether a UE can apply a configuration or reconfiguration received from a base station. A failure of the applicability check refers to a case in which all or a part of received configuration or reconfiguration information includes a configuration value that the UE cannot apply. On the other hand, a success of the applicability check refers to a case in which the UE can apply received configuration or reconfiguration information. In various embodiments, an applicability check may also be referred to as a "compliance check".

FIG. 1 illustrates a wireless communication system according to various embodiments. FIG. 1 illustrates a base station 110, a terminal 120, and a terminal 130, as parts of nodes using a wireless channel in a wireless communication system. FIG. 1 illustrates only one base station, but may further include another base station that is the same as or similar to the base station 110.

The base station 110 is a network infrastructure that provides wireless access to the terminals 120 and 130. The base station 110 has coverage defined as a predetermined geographic area on the basis of the distance over which a signal may be transmitted. The base station 110 may be referred to as, in addition to "base station", "access point (AP)", "eNodeB (eNB)", "5G node (5th generation node)", "next generation nodeB (gNB)", "wireless point", "transmission/reception point (TRP)", or other terms having equivalent technical meanings.

Each of the terminal 120 and the terminal 130 is a device used by a user, and performs communication with the base station 110 via the wireless channel. In some cases, at least one of the terminal 120 and the terminal 130 may be operated without involvement of a user. That is, at least one of the terminal 120 and the terminal 130 is a device that performs machine type communication (MTC) and may not be carried by a user. Each of the terminal 120 and the terminal 130 may be referred to as, in addition to "terminal", "user equipment (UE)", "mobile station", "subscriber station", "remote terminal", "wireless terminal", "user device", or other terms having equivalent technical meanings.

The base station 110, the terminal 120, and the terminal 130 may transmit and receive wireless signals in a millimeter wave band (e.g., 28 GHz, 30 GHz, 38 GHz, and 60 GHz). At this time, in order to improve a channel gain, the base station 110, the terminal 120, and the terminal 130 may perform beamforming. The beamforming may include transmission beamforming and reception beamforming. That is, the base station 110, the terminal 120, and the terminal 130 may assign a directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, communication may then be performed via resources that are in quasi co-located (QCL) relationship with resources at which the serving beams 112, 113, 121, and 131 are transmitted.

If it is possible to infer large-scale characteristics of a channel for transferring of a symbol on a first antenna port, from a channel for transferring of a symbol on a second antenna port, then it may be estimated that the first antenna port and the second antenna port are in a QCL relationship. For example, the large-scale characteristics may include at least one among a delay spread, a Doppler spread, a Doppler shift, an average gain, an average delay, and a spatial receiver parameter.

Figure 2:
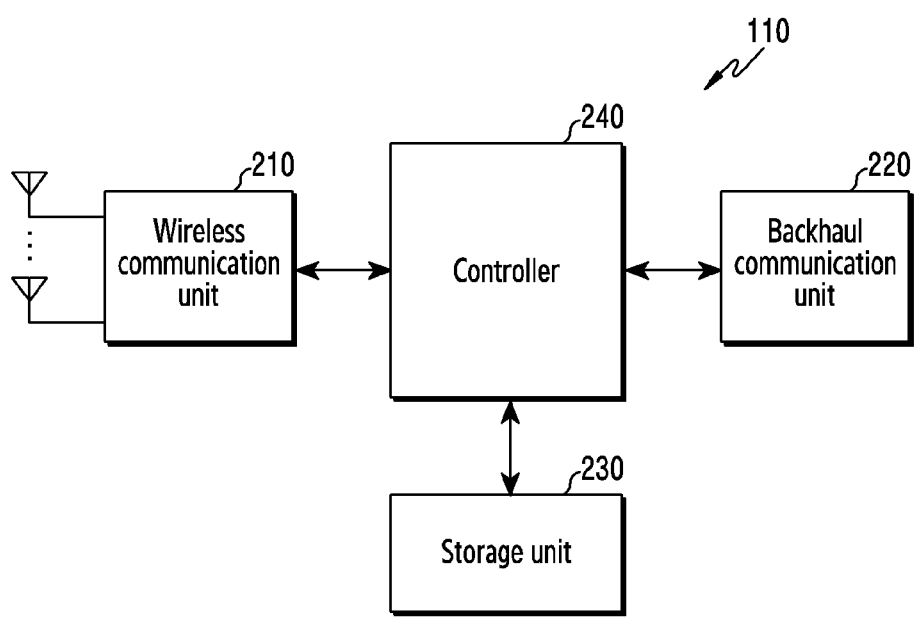
FIG. 2 illustrates a configuration of a base station in the wireless communication system according to various embodiments.

FIG. 2 illustrates a configuration of a base station in the wireless communication system according to various embodiments. The configuration illustrated in FIG. 2 may be understood as a configuration of the base station 110. The terms "~ unit", "~ device", etc. used hereinafter refer to a unit that processes at least one function or operation, which may be implemented by hardware or software, or a combination of hardware and software.

Referring to FIG. 2, the base station includes a wireless communication unit 210, a backhaul communication unit 220, a storage unit 230, and a controller 240.

The wireless communication unit 210 performs functions to transmit or receive a signal through a wireless channel. For example, the wireless communication unit 210 performs conversion between a baseband signal and a bitstream according to a physical layer specification of a system. For example, during data transmission, the wireless communication unit 210 generates complex symbols by encoding and modulating a transmission bitstream. When receiving data, the wireless communication unit 210 restores the received bitstream by demodulating and decoding the baseband signal.

Further, the wireless communication unit 210 up-converts the baseband signal to a radio frequency (RF) band signal, transmits the up-converted RF band signal via an antenna, and then down-converts the RF band signal received via the antenna to a baseband signal. To this end, the wireless communication unit 210 may include a transmission filter, a reception filter, an amplifier, a mixer, an oscillator, a digital-to-analog converter (DAC), an analog-to-digital converter (ADC), and the like. Also, the wireless communication unit 210 may include multiple transmission/reception paths. Further, the wireless communication unit 210 may include at least one antenna array including multiple antenna elements.

In terms of hardware, the wireless communication unit 210 may include a digital unit and an analog unit, wherein the analog unit includes multiple sub-units according to an operating power, an operating frequency, and the like. The digital unit may be implemented as at least one processor (e.g., a digital signal processor (DSP)).

The wireless communication unit 210 transmits and receives a signal as described above. Accordingly, all or a part of the wireless communication unit 210 may be referred to as a "transmitter", a "receiver", or a "transceiver". In the following description, transmission and reception performed via a wireless channel are used in a sense including processing performed as described above by the wireless communication unit 210.

The backhaul communication unit 220 provides an interface that performs communication with other nodes within a network. That is, the backhaul communication unit 220 converts, into a physical signal, a bitstream transmitted from a base station to another node, for example, another access node, another base station, an upper node, a core network, etc., and converts a physical signal received from another node into a bitstream.

The storage unit 230 stores data, such as a basic program, an application program, configuration information, and the like for operation of the base station. The storage unit 230 may include a volatile memory, a nonvolatile memory, or a combination of a volatile memory and a nonvolatile memory. The storage unit 230 provides stored data in response to a request of the controller 240.

The controller 240 controls overall operations of the base station. For example, the controller 240 transmits and receives a signal via the wireless communication unit 210 or the backhaul communication unit 220. Further, the controller 240 records and reads data in the storage unit 230. The controller 240 may perform functions of a protocol stack required by the communication standard. According to another implement, the protocol stack may be included in the wireless communication unit 210. To this end, the controller 240 may include at least one processor.

According to various embodiments, the controller 240 may control the base station to perform operations according to various embodiments described below.

Figure 3:
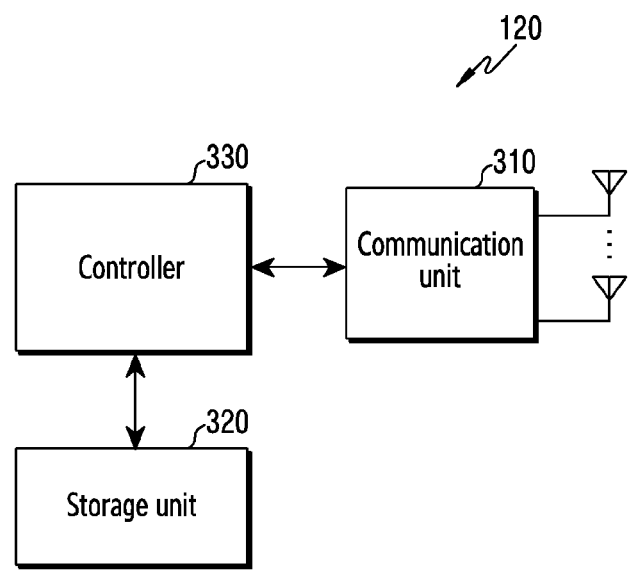
FIG. 3 illustrates a configuration of a terminal in the wireless communication system according to various embodiments.

FIG. 3 illustrates a configuration of a terminal in the wireless communication system according to various embodiments. The configuration illustrated in FIG. 3 may be understood as a configuration of the terminal 120. The terms "~ unit", "~ device", etc. used hereinafter refer to a unit that processes at least one function or operation, which may be implemented by hardware or software, or a combination of hardware and software.

Referring to FIG. 3, the terminal may include a communication unit 310, a storage unit 320, and a controller 330.

The communication unit 310 performs functions for transmitting or receiving a signal via a wireless channel. For example, the communication unit 310 performs conversion between a baseband signal and a bitstream according to a physical layer specification of the system. For example, during data transmission, the communication unit 310 generates complex symbols by encoding and modulating a transmission bitstream. When receiving data, the communication unit 310 restores the received bitstream by demodulating and decoding the baseband signal. The communication unit 310 up-converts the baseband signal into an RF band signal, transmits the up-converted RF band signal via an antenna, and then down-converts the RF band signal received via the antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include at least one antenna array including multiple antenna elements. In terms of hardware, the communication unit 310 may include a digital circuit and an analog circuit (e.g., a radio frequency integrated circuit (RFIC)). The digital circuit and the analog circuit may be implemented in a single package. The communication unit 310 may include a plurality of RF chains. Further, the communication unit 310 may perform beamforming.

The communication unit 310 transmits and receives a signal as described above. Accordingly, all or a part of the communication unit 310 may be referred to as "transmitter", "receiver", or "transceiver". In the following description, transmission and reception performed via a wireless channel are used in a sense including processing performed as described above by the wireless communication unit 310.

The storage unit 320 stores data, such as a basic program, an application program, configuration information, and the like for operation of the terminal. The storage unit 320 may include a volatile memory, a nonvolatile memory, or a combination of a volatile memory and a nonvolatile memory. The storage unit 320 provides stored data in response to a request of the controller 330.

The controller 330 controls overall operations of the terminal. For example, the controller 330 transmits and receives a signal via the communication unit 310. Further, the controller 330 records and reads data in the storage unit 320. The controller 330 may perform functions of a protocol stack required by the communication standard. To this end, the controller 330 may include at least one processor or a micro-processor, or may be a part of a processor. A part of the communication unit 310 and the controller 330 may be referred to as a communication processor (CP).

According to various embodiments, the controller 330 may control the terminal to perform operations according to various embodiments described below.

Figure 4:
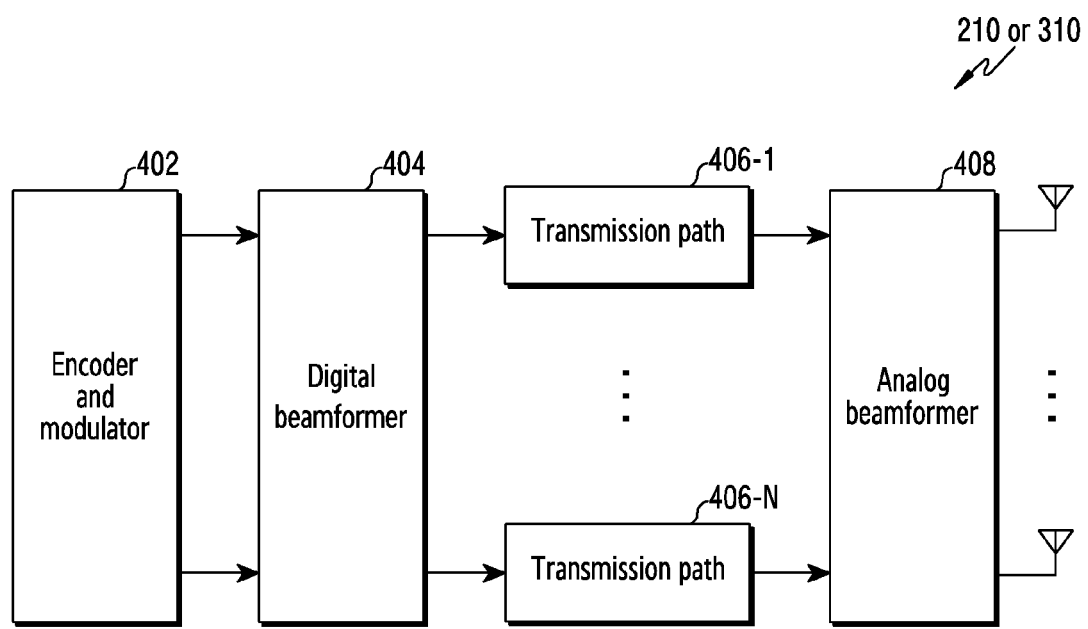
FIG. 4 illustrates a configuration of a communication unit in the wireless communication system according to various embodiments.

FIG. 4 illustrates a configuration of a communication unit in the wireless communication system according to various embodiments. FIG. 4 illustrates an example of a detailed configuration of the wireless communication unit 210 of FIG. 2 or the communication unit 310 of FIG. 3. Specifically, FIG. 4 illustrates elements to perform beamforming, as a part of the wireless communication unit 210 of FIG. 2 or the communication unit 310 of FIG. 3.

Referring to FIG. 4, the wireless communication unit 210 or the communication unit 310 includes an encoder and modulator 402, a digital beamformer 404, a plurality of transmission paths 406-1 to 406-N, and an analog beamformer 408.

The encoder and modulator 402 performs channel encoding. For channel encoding, at least one among a low density parity check (LDPC) code, a convolution code, a polar code may be used. The encoder and modulator 402 generates modulation symbols by performing constellation mapping.

The digital beamformer 404 performs beamforming on a digital signal (e.g., modulation symbols). To this end, the digital beamformer 404 multiplies modulation symbols by beamforming weights. Here, the beamforming weights are used to change a magnitude and phase of a signal, and may be referred to as "a precoding matrix", "a precoder", or the like. The digital beamformer 404 outputs digital-beamformed modulation symbols to the plurality of transmission paths 406-1 to 406-N. According to a multiple input multiple output (MIMO) transmission technique, the modulation symbols may be multiplexed or the same modulation symbols may be provided to the plurality of transmission paths 406-1 to 406-N.

The plurality of transmission paths 406-1 to 406-N convert digital beamformed-signals into analog-signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be excluded when another physical layer scheme (e.g., a filter bank multi-carrier (FBMC)) is applied. That is, the plurality of transmission paths 406-1 to 406-N provide independent signal processing processes to a plurality of streams generated via digital beamforming. However, depending on an implementation scheme, some elements of the plurality of transmission paths 406-1 to 406-N may be used in common.

The analog beamformer 408 performs beamforming on an analog signal. To this end, the digital beamformer 404 multiplies analog signals by beamforming weights. The beamforming weights are used to change a magnitude and a phase of a signal. Specifically, according to a connection structure between the plurality of transmission paths 406-1 to 406-N and antennas, the analog beamformer 440 may be configured in various manners. For example, each of the plurality of transmission paths 406-1 to 406-N may be connected to one antenna array. As another example, the plurality of transmission paths 406-1 to 406-N may be connected to one antenna array. As still another example, the plurality of transmission paths 406-1 to 406-N may be adaptively connected to one antenna array or may be connected to two or more antenna arrays.

Figure 5:
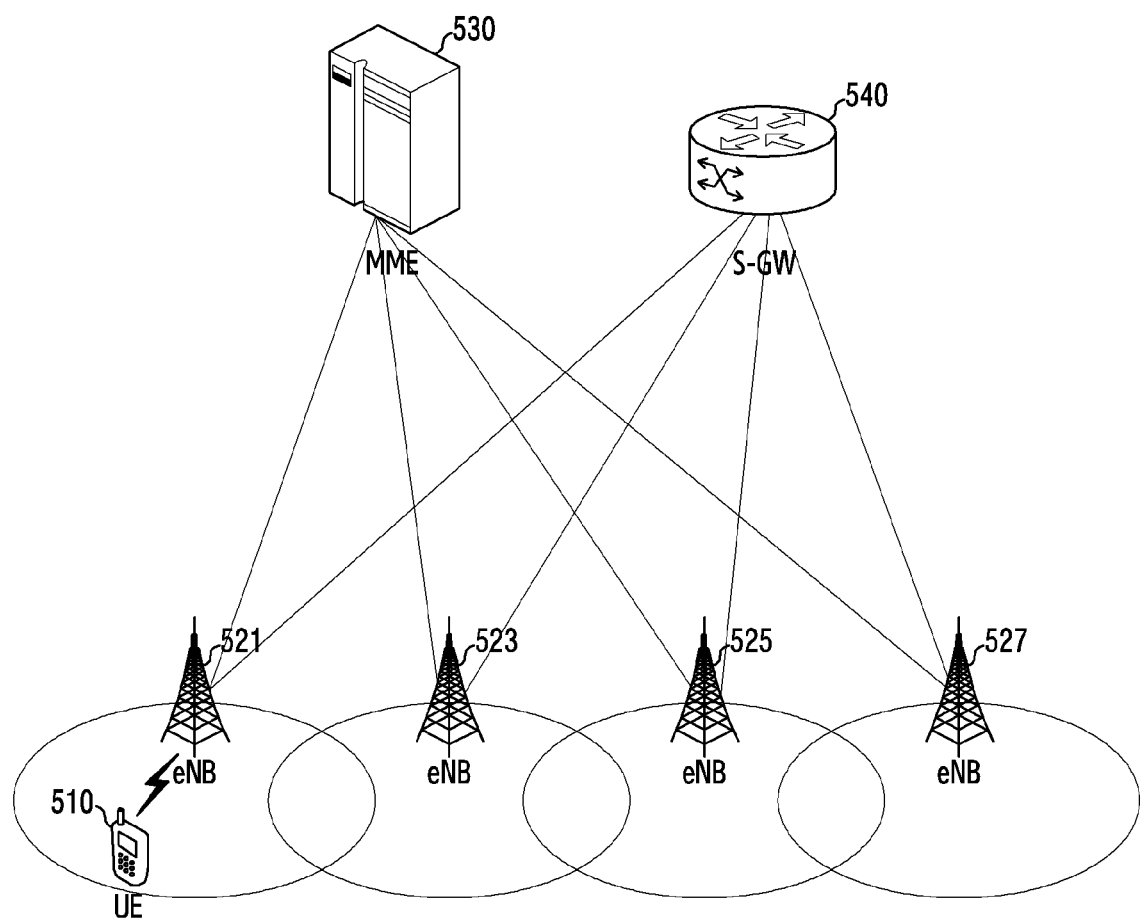
FIG. 5 illustrates an example of a structure of the wireless communication system according to various embodiments.

FIG. 5 illustrates an example of a structure of the wireless communication system according to various embodiments. The wireless communication system illustrated in FIG. 5 may be an LTE system.

Referring to FIG. 5, a radio access network of the LTE system may include eNBs 521, 523, 525, and 527, a mobility management entity (MME) 530, and a serving gateway (S-GW) 540. A UE 510 may access at least one of the eNBs 521, 523, 525, and 527 and an external network via the S-GW 540.

In FIG. 5, the eNBs 521, 523, 525, and 527 may correspond to node B of a universal mobile telecommunication system (UMTS). The eNB 521 is connected to the UE 510 via a wireless channel, and may perform a more complex role than node B. In the LTE system, all user traffic including a real-time service, such as a voice over Internet protocol (VoIP) via the Internet protocol, may be serviced through a shared channel. Accordingly, a device that performs scheduling based on state information, such as buffer states, available transmission power states, and channel states of UEs, may be needed, and such a device may be the eNBs 521, 523, 525, and 527. One eNB (e.g., the eNB 521) may control multiple cells. For example, in order to realize a transmission rate of 100 Mbps, the LTE system may use OFDM as a radio access technology, for example, in a bandwidth of 20 megaHertz (MHz). Further, the eNB (e.g., eNB 521) may use an adaptive modulation & coding (AMC) scheme for determining a channel coding rate and a modulation scheme on the basis of the channel state of a terminal. The S-GW 540 is a device that provides a data bearer, and may generate or eliminate a data bearer under the control of the MME 530. The MME 530 is a device that is in charge of mobility management functions and various control functions for the terminal (e.g., the UE 510), and may be connected to a plurality of base stations (e.g., the eNBs 521, 523, 525, and 527).

Figure 6:
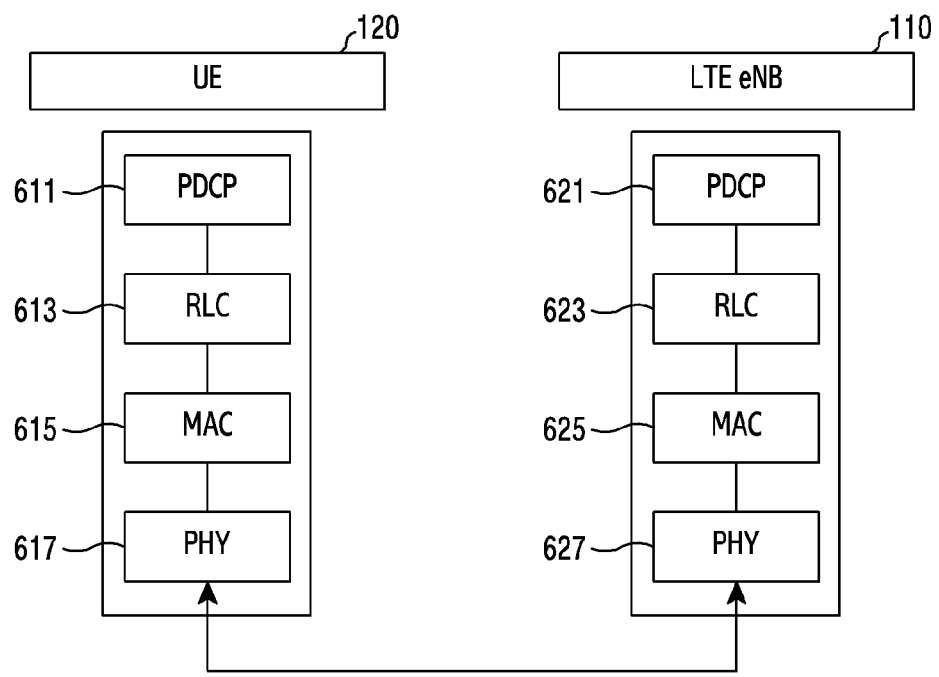
FIG. 6 illustrates an example of a wireless protocol structure in the wireless communication system according to various embodiments.

FIG. 6 illustrates an example of a wireless protocol structure in the wireless communication system according to various embodiments. The wireless communication system illustrated in FIG. 6 may be an LTE system.

Referring to FIG. 6, a wireless protocols of the LTE system may include, in the terminal 120 and the eNB 110, packet data convergence protocols (PDCPs) 611 and 621, radio link controls (RLCs) 713 and 723, medium access controls (MACs) 715 and 725, and physical layers (PHYs) 617 and 627, respectively. The PDCPs 611 and 621 may perform operations, such as IP header compression/restoration. Main functions of PDCPs 611 and 621 include at least one of the following examples, but are not limited to the following examples:

- a header compression and decompression function (ROHC)
- a user data transmission function (transfer of user data)
- a sequential delivery function (in-sequence delivery of upper layer PDUs at PDCP re-establishment procedure for RLC AM)
- a reordering function (for split bearers in dual connectivity (only support for RLC AM): PDCP PDU routing for transmission and PDCP PDU reordering for reception)
- a duplicate detection function (duplicate detection of lower layer SDUs at PDCP re-establishment procedure for RLC AM)
- a retransmission function (retransmission of PDCP SDUs at handover and, for split bearers in DC, of PDCP PDUs at PDCP data-recovery procedure, for RLC AM)
- an encryption and decryption function (ciphering and deciphering)
- a timer-based SDU delete function (timer-based SDU discard in uplink)

According to an embodiment, the RLCs 613 and 623 may reconfigure a PDCP packet data unit (PDU) to an appropriate size so as to perform operations, such as an automatic repeat request (ARQ). Main functions of the RLCs 613 and 623 include at least one of the following examples, but are not limited to the following examples:

- a data transmission function (transfer of upper layer PDUs)
- an ARQ function (error correction through ARQ (only for AM data transfer))
- a concatenation, segmentation, and reassembly function (concatenation, segmentation, and reassembly of RLC SDUs (only for UM and AM data transfer))
- a re-segmentation function (re-segmentation of RLC data PDUs (only for AM data transfer))
- a reordering function (reordering of RLC data PDUs (only for UM and AM data transfer))
- a duplicate detection function (duplicate detection (only for UM and AM data transfer))

an error detection function (protocol error detection (only for AM data transfer))

an RLC SDU deletion function (RLC SDU discard (only for UM and AM data transfer))

an RLC re-establishment function (RLC re-establishment)

According to an embodiment, the MACs 615 and 625 may be connected to various RLC layer devices configured in the UE (terminal) 120, and may perform an operation of multiplexing RLC PDUs to a MAC PDU and demultiplexing RLC PDUs from the MAC PDU. Main functions of the MACs 715 and 717 include at least one of the following examples, but are not limited to the following examples:

a mapping function (mapping between logical channels and transport channels)

a multiplexing and demultiplexing function (multiplexing/demultiplexing of MAC SDUs belonging to one or different logical channels into/from transport blocks (TB) delivered to/from the physical layer on transport channels)

a scheduling information reporting function (scheduling information reporting)

a HARQ function (error correction through HARQ)

a function of adjusting priority between logical channels (priority handling between logical channels of one UE)

a function of adjusting priority between UEs (priority handling between UEs by means of dynamic scheduling)

an MBMS service identification function (MBMS service identification)

a transmission format selection function (transport format selection)

a padding function (padding)

According to an embodiment, PHY 617 and 627 may perform channel-coding and modulation of upper layer data, converting the channel-coded and modulated upper layer data into OFDM symbols and transmitting the converted OFDM symbols via a wireless channel, or demodulating and channel-decoding the OFDM received through the wireless channel and transferring the same to the upper layer.

Figure 7:
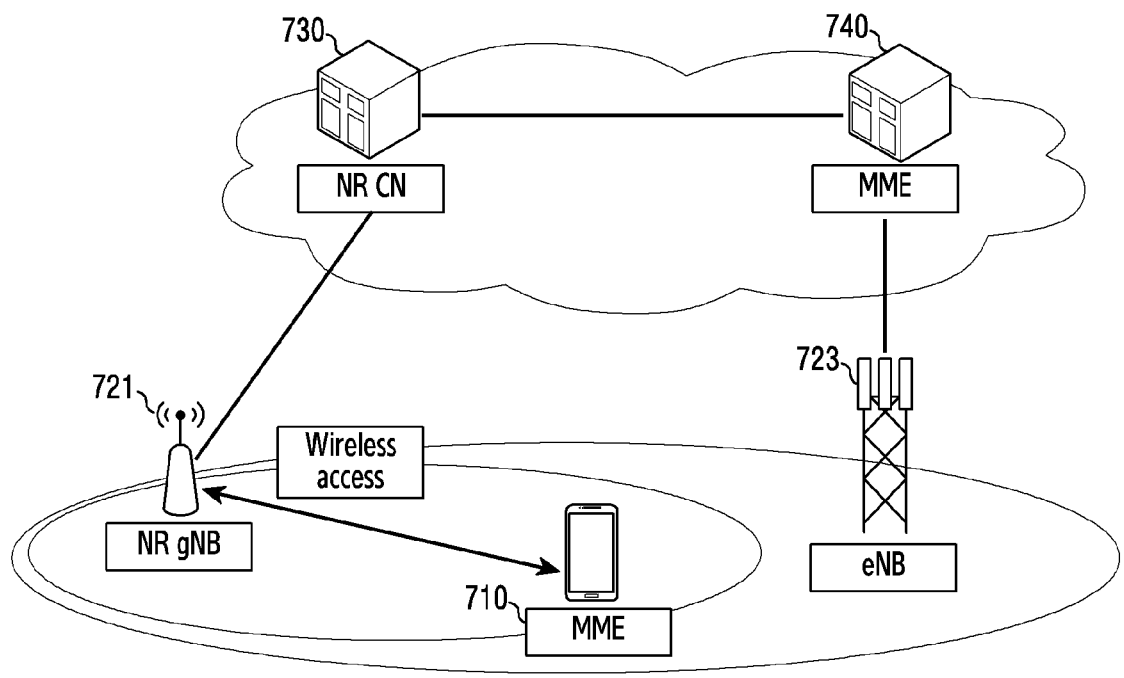
FIG. 7 illustrates another example of the structure of the wireless communication system according to various embodiments.

FIG. 7 illustrates another example of the structure of the wireless communication system according to various embodiments. The wireless communication system illustrated in FIG. 7 may be an NR system.

Referring to FIG. 7, a wireless access network of the NR system may include an NR gNB 721 and an NR core network (CN) 730. An NR UE 710 (e.g., the terminal 120) may access an external network via the NR gNB 721 and the NR CN 730.

In FIG. 7, the NR gNB 721 may correspond to an eNB of the LTE system. The NR gNB 721 is connected to the NR UE 710 via a wireless channel and may provide a more superior service than a node B and/or an eNB. In the NR system, all user traffic may be serviced via a shard channel. Accordingly, a device that performs scheduling based on state information, such as buffer states, available transmission power states, and channel states of UEs, may be needed, and such a device may be the NR gNB 721. The NR gNB 721 may control multiple cells. In the NR system, in order to implement ultra-fast data transmission compared to LTE, a bandwidth greater than or equal to a maximum bandwidth supported by LTE may be applied. In the NR system, OFDM may be used as a wireless access technology, and a beam-forming technology may be additionally used.

According to an embodiment, the NR gNB 721 may use an AMC scheme that determines a modulation scheme and a channel coding rate on the basis of a channel state for the UE 710. The NR CN 730 may perform functions, such as mobility support, a bearer configuration, and a quality of service (QoS) configuration. The NR CN 730 may perform mobility management functions and various control functions for the UE 710, and may be connected to multiple base stations.

According to various embodiments, the NR system may interwork with the LTE system. In this case, the NR CN 730 may be connected to an MME 740 via a network interface. The MME 740 may be connected to an eNB 723 that is a base station of the LTE system.

Figure 8:
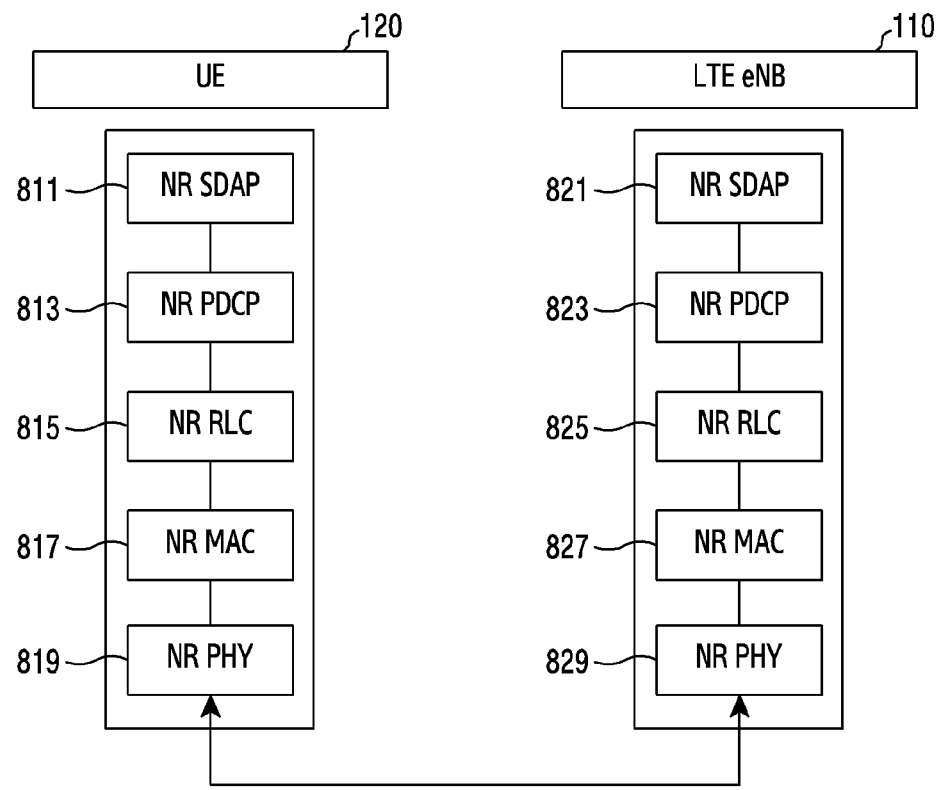
FIG. 8 illustrates another example of the wireless protocol structure in the wireless communication system according to various embodiments.

FIG. 8 illustrates another example of the wireless protocol structure in the wireless communication system according to various embodiments. The wireless communication system illustrated in FIG. 8 may be an NR system.

Referring to FIG. 8, a wireless protocol of the NR system may include NR service data adaptation protocols (SDAPs) 811 and 821, NR PDCPs 813 and 823, NR RLCs 815 and 825, NR MACs 817 and 827, and NR PHYs 819 and 829 in a UE (e.g., the terminal 120) and an NR base station (e.g., the base station 110), respectively.

According to an embodiment, main functions of the NR SDAPs 811 and 821 include at least one of the following examples, but are not limited thereto:

a user data transfer function (transfer of user plane data)

a function of mapping a QoS flow and a data bearer for uplink and downlink (mapping between a QoS flow and a DRB for both DL and UL)

a function of marking a QoS flow ID in uplink and downlink (marking QoS flow ID in both DL and UL packets)

a function of mapping QoS flows to a data bearer for respective uplink SDAP PDUs (reflective QoS flow to DRB mapping for the UL SDAP PDUs)

For an SDAP layer device, the terminal 120 may be configured whether to use a header of the SDAP layer device or use a function of the SDAP layer device for each PDCP layer device, for each bearer, or for each logical channel, via a radio resource control (RRC) message. When the SDAP header is configured, the SDAP layer device may indicate the terminal 120 to update or reconfigure mapping information for a QoS flow and a data bearer in uplink and downlink, via an access stratum (AS) quality of service (QoS) reflection configuration 1-bit indicator (AS reflective QoS) and a non-access stratum (NAS) QoS reflection configuration 1-bit indicator (NAS reflective QoS) of the SDAP header. According to an embodiment, the SDAP header may include QoS flow ID information indicating a QoS. According to an embodiment, QoS information may function as or similar to scheduling information and data processing priority for supporting a smooth service.

According to an embodiment, main functions of the NR PDCPs 813 and 823 include at least one of the following examples, but are not limited thereto:

a header compression and decompression function (header compression and decompression, ROHC only)

a user data transmission function (transfer of user data)

a sequential delivery function (in-sequence delivery of upper layer PDUs)

a non-sequential delivery function (out-of-sequence delivery of upper layer PDUs)

a reordering function (PDCP PDU reordering for reception)

a duplicate detection function (duplicate detection of lower layer SDUs)

a retransmission function (retransmission of PDCP SDUs)

an encryption and decryption function (ciphering and deciphering)

a timer-based SDU delete function (timer-based SDU discard in uplink)

In the above-described functions of the NR PDCPs 813 and 823, the reordering function may refer to a function of reordering PDCP PDUs received from a lower layer, in order based on a PDCP sequence number (SN). The reordering function of an NR PDCP device may include a function of transferring data to an upper layer in the reordered order, may include a function of directly transferring data without considering the order, may include a function of reordering and recording lost PDCP PDUs, may include a function of reporting states of the lost PDCP PDUs to a transmission side, or may include a function of requesting retransmission of the lost PDCP PDUs.

According to an embodiment, main functions of the NR RLCs 815 and 825 include at least one of the following examples, but are not limited thereto:

a data transmission function (transfer of upper layer PDUs)

a sequential delivery function (in-sequence delivery of upper layer PDUs)

a non-sequential delivery function (out-of-sequence delivery of upper layer PDUs)

an ARQ function (error Correction through ARQ)

a concatenation, segmentation, and reassembly function (concatenation, segmentation, and reassembly of RLC SDUs)

a re-segmentation function (re-segmentation of RLC data PDUs)

a reordering function (reordering of RLC data PDUs)

a duplicate detection function (duplicate detection)

an error detection function (protocol error detection)

an RLC SDU deletion function (RLC SDU discard)

an RLC re-establishment function (RLC re-establishment)

In the above-described functions of the NR RLCs 815 and 825, the in-sequence delivery may refer to a function of sequentially transferring RLC SDUs received from a lower layer to an upper layer. When one RLC SDU is divided into multiple RLC SDUs and received, the in-sequence delivery function of the NR RLC device may include a function of reassembling the multiple divided RLC SDUs and then transferring the reassembled RLC SDUs to the upper layer.

The in-sequence delivery function of the NR RLC device may include a function of rearranging the received RLC PDUs according to an RLC sequence number (SN) or a PDCP sequence number (SN), may include a function of reordering and recording lost RLC PDUs, may include a function of reporting states of the lost RLC PDUs to a transmission side, and may include a function of requesting retransmission for lost RLC PDUs.

The in-sequence delivery function of the NR RLC device may include a function of, when a lost RLC SDU exists, sequentially transferring, to the upper layer, only RLC SDUs before the lost RLC SDU.

The in-sequence delivery function of the NR RLC device may include a function of, if a predetermined timer expires, sequentially transferring all RLC SDUs, which are received before the timer starts, to the upper layer even if a lost RLC SDU exists.

The in-sequence delivery function of the NR RLC device may include a function of, if the predetermined timer expires, sequentially transferring all RLC SDUs, which have been received so far, to the upper layer even if a lost RLC SDU exists.

The NR RLC device may process RLC PDUs in the order of receiving the RLC PDUs regardless of the order of sequence numbers (out-of-sequence delivery) and may transfer the RLC PDUs to the NR PDCP device.

When the NR RLC device receives a segment, segments that are stored in a buffer or to be received at a later time are received, reconstructed into one complete RLC PDU, and then transmitted to the NR PDCP device.

The NR RLCs 815 and 825 may not perform a concatenation function, in which case the NR MACs 817 and 827 perform a concatenation function, or a concatenation function may be replaced by a multiplexing function of NR MACs 815 and 825.

In the above-described functions of the NR RLCs 815 and 825, the out-of-sequence delivery function of the NR RLC device may refer to a function of transferring RLC SDUs received from a lower layer to an immediate upper layer regardless of the order. The out-of-sequence delivery function of the NR RLC device may include a function of, when one RLC SDU is divided into multiple RLC SDUs and received, reassembling and transferring the multiple divided RLC SDUs. The out-of-sequence delivery function of the NR RLC device may include a function of storing the RLC SNs or PDCP SNs of the received RLC PDUs, arranging the order, and recording lost RLC PDUs.

According to an embodiment, the NR MACs 817 and 827 may be connected to multiple NR RLC layer devices configured in the terminal 120. Main functions of the NR MACs 817 and 827 include at least one of the following examples, but are not limited to the following examples:

a mapping function (mapping between logical channels and transport channels)

a multiplexing and demultiplexing function (multiplexing/demultiplexing of MAC SDUs)

a scheduling information reporting function (scheduling information reporting)

a HARQ function (error correction through HARQ)

a function of adjusting priority between logical channels (priority handling between logical channels of one UE)

a function of adjusting priority between UEs (priority handling between UEs by means of dynamic scheduling)

an MBMS service identification function (MBMS service identification)

a transmission format selection function (transport format selection)

a padding function (padding)

The NR PHYs 819 and 829 may perform channel-coding and modulation of upper layer data, converting the channel-coded and modulated upper layer data into OFDM symbols and transmitting the converted OFDM symbols via a wireless channel, or may perform demodulation and channel-decoding of the OFDM received through the wireless channel and transferring the same to the upper layer.

A Conditional Handover (CHO) is defined as a handover that is executed by the UE when one or more handover execution conditions are met. The UE starts evaluating the execution condition(s) upon receiving the CHO configuration, and stops evaluating the execution condition(s) once the execution condition(s) is met.

The network configures the UE with one or more candidate target SpCells in the conditional configuration. The UE evaluates the condition of each configured candidate target SpCell. The UE applies the conditional configuration associated with one of the target SpCells which fulfils associated execution condition. The network provides the configuration parameters for the target SpCell in the ConditionalReconfiguration information.

Figure 9:
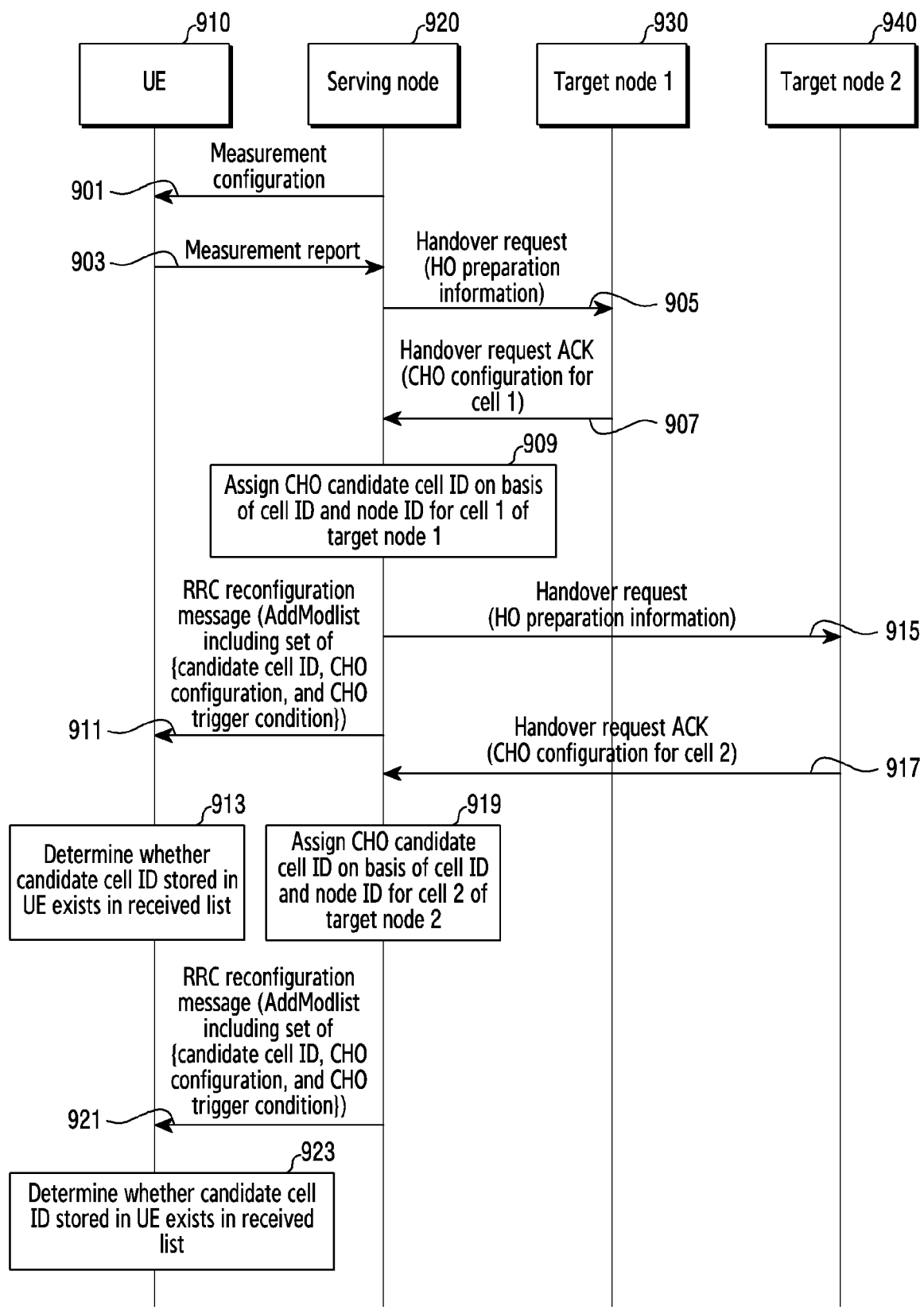
FIG. 9 illustrates an example of a case in which a serving node receives CHO configuration information from a target node and then assigns a CHO candidate cell ID in the wireless communication system according to various embodiments.

FIG. 9 illustrates an example of a case in which a serving node receives CHO configuration information from a target node and then assigns a CHO candidate cell ID in the wireless communication system according to various embodiments. In FIG. 9, a UE 910 may be the terminal 120, and a serving node 920 may be the base station 110. Each of target node 1 930 and target node 2 940 may have the elements of the base station 110 illustrated in FIG. 2.

Referring to FIG. 9, in operation 901, the UE 910 may receive a measurement configuration from the serving node 920. For example, the UE 910 may be connected to a serving cell and may receive a measurement configuration from the serving node 920 related to the serving cell.

In operation 903, the UE 910 may transmit a measurement report to the serving node 920. The UE 910 may perform measurement based on the measurement configuration and may transmit the measurement report including a measurement result to the serving node 920.

In operation 905, the serving node 920 may transmit a HANDOVER REQUEST message to target node 1 930. For example, the serving node 920 may transmit the HANDOVER REQUEST message for requesting a CHO to target node 1 930 related to at least one cell, on the basis of the measurement result. In various embodiments, the HANDOVER REQUEST message may include handover (HO) preparation information.

In operation 907, target node 1 930 may transmit a handover request acknowledgment (ACK) message to the serving node 920. Target node 1 930 may reserve a resource to be used by the UE 910 and may transmit the HANDOVER REQUEST ACK message including CHO configuration information for cell 1 of target node 1 930 to the serving node 920.

In operation 909, the serving node 920 may assign a CHO candidate cell ID on the basis of a node ID and a cell ID for cell 1 of target node 1 930. For example, the serving node 920 may assign the CHO candidate cell ID by using information related to an ID of target node 1 930 and/or information related to an ID of a target cell (e.g., cell 1) in the CHO configuration information. The CHO candidate cell ID assigned in operation 909 may be the ID of cell 1 of the target node 930.

In operation 911, the serving node 920 may transmit an RRC reconfiguration message to the UE 910. The RRC reconfiguration message in operation 911 may include a list of one or more candidate cell configurations {a CHO candidate cell ID assigned by the serving node 920, a CHO configuration for a candidate cell of the CHO candidate cell ID, and a CHO trigger condition for the candidate cell}, and the list may be referred to as "AddModlist". In various embodiments, for the list of candidate cell configurations, the UE 910 may, based on a candidate cell ID, i) correct a candidate cell configuration for a candidate cell ID which the UE 910 already has, and ii) enable a candidate cell configuration for a candidate cell ID, which the UE 910 does not have, to be stored in the UE 910.

In operation 913, the UE 910 may determine whether a candidate cell ID stored in the UE 910 exists in the received list. If the candidate cell ID stored in the UE 910 exists in the received list, the UE 910 may update a CHO configuration and a CHO trigger condition for the candidate cell ID stored in the UE 910, with a CHO configuration and a CHO trigger condition for the candidate cell ID in the list of received candidate cell configurations. In other words, if the candidate cell ID stored in the UE 910 exists in the received list, the UE 910 may update the candidate cell configuration related to the candidate cell ID stored in the UE 910, with a received candidate cell configuration related to the corresponding candidate cell ID. In various embodiments, the list received from the serving node 920 may include: i) all candidate cell configurations for all candidate cells regardless of a candidate cell configuration to be changed; ii) candidate cell configurations to be changed based on the configuration of the UE 910 currently used in the serving cell; or iii) candidate cell configurations changed based on previously transmitted candidate cell configurations. When the UE 910 updates the candidate cell configuration, if the candidate cell ID stored in the UE 910 exists in the received list, the following operations of A), B) or C) may be performed for the cases of i), ii), and iii), respectively. A) The UE 910 may delete the candidate cell configuration for the corresponding candidate cell ID stored in the UE 910 and may store the received candidate cell configuration related to the corresponding candidate cell ID. B) With respect to the candidate cell configuration for the corresponding candidate cell ID stored in the UE 910, the UE 910 may change, to the received configuration information, configuration information different from the candidate cell configuration related to the currently stored corresponding candidate cell ID in comparison with the configuration updated to the received candidate cell configuration on the basis of the configuration of the UE being used in the current serving cell, or the UE 910 may newly add and store the received configuration information. C) The UE 910 may change, to the received configuration information, configuration information different from the currently received candidate cell configuration among previously received candidate cell configurations, or may newly add and store the received configuration information. If a candidate cell configuration having a candidate cell ID differing from the candidate cell ID stored in the UE 910 exists in the list of the candidate cell configurations received from the serving node 920, the UE 910 may store a candidate cell configuration for a new candidate cell ID (e.g., a CHO configuration and a CHO trigger condition), may perform measurement on a new candidate cell on the basis of the candidate cell configuration, and may evaluate whether a CHO trigger condition for the new candidate cell is satisfied.

In operation 915, the serving node 920 may transmit a HANDOVER REQUEST message to target node 2 940. For example, the serving node 920 may transmit the HANDOVER REQUEST message for requesting a CHO to target node 2 940 related to at least one cell, on the basis of the measurement result. In various embodiments, the HANDOVER REQUEST message may include handover preparation information.

In operation 917, target node 2 940 may transmit a handover request acknowledgment message to the serving node 920. Target node 2 940 may reserve a resource to be used by the UE 910 and may transmit the HANDOVER REQUEST ACK message including CHO configuration information for cell 2 of target node 2 940 to the serving node 920.

In operation 919, the serving node 920 may assign a CHO candidate cell ID on the basis of a node ID and a cell ID for cell 1 of target node 1 940. For example, the serving node 920 may assign a CHO candidate cell ID by using information related to an ID of target node 2 940 and/or information related to an ID of a target cell (e.g., cell 2) in the CHO configuration information. The CHO candidate cell ID assigned in operation 909 may be an ID for cell 2 of the target node 940.

In operation 921, the serving node 920 may transmit an RRC reconfiguration message to the UE 910. The RRC reconfiguration message in operation 921 may include a list of one or more candidate cell configurations {a CHO candidate cell ID assigned by the serving node 920, a CHO configuration for a candidate cell of the CHO candidate cell ID, and a CHO trigger condition for the candidate cell}, and the list may be referred to as "AddModlist".

In operation 923, the UE 910 may determine whether a candidate cell ID stored in the UE 910 exists in the received list. If the candidate cell ID stored in the UE 910 exists in the received list, the UE 910 may update a CHO configuration and a CHO trigger condition for the candidate cell ID stored in the UE 910, with a CHO configuration and a CHO trigger condition for the corresponding candidate cell ID in the list of received candidate cell configurations. In other words, if the candidate cell ID stored in the UE 910 exists in the received list, the UE 910 may update the candidate cell configuration related to the candidate cell ID stored in the UE 910, with the received candidate cell configuration related to the corresponding candidate cell ID. In various embodiments, for the list received from the serving node 920 may include: i) all candidate cell configurations for all candidate cells regardless of candidate cell configurations to be changed; ii) candidate cell configurations to be changed based on the configuration of the UE 910 currently used in the serving cell; or iii) candidate cell configurations changed based on previously transmitted candidate cell configurations. When the UE 910 updates the candidate cell configuration, if the candidate cell ID stored in the UE 910 exists in the received list, the following operations of A), B) or C) may be performed for the cases of i), ii), and iii), respectively. A) The UE 910 may delete the candidate cell configuration for the corresponding candidate cell ID stored in the UE 910 and may store the received candidate cell configuration related to the corresponding candidate cell ID. B) With respect to the candidate cell configuration for the corresponding candidate cell ID stored in the UE 910, the UE 910 may change, to the received configuration information, configuration information different from the candidate cell configuration related to the currently stored corresponding candidate cell ID in comparison with the configuration updated to the received candidate cell configuration on the basis of the configuration of the UE being used in the current serving cell, or the UE 910 may newly add and store the received configuration information. C) The UE 910 may change, to the received configuration information, configuration information different from the currently received candidate cell configuration among previously received candidate cell configurations, or may newly add and store the received configuration information. If a candidate cell configuration having a candidate cell ID differing from the candidate cell ID stored in the UE 910 exists in the list of the candidate cell configurations received from the serving node 920, the UE 910 may store a candidate cell configuration for a new candidate cell ID (e.g., a CHO configuration and a CHO trigger condition), may perform measurement on a new candidate cell on the basis of the candidate cell configuration, and may evaluate whether a CHO trigger condition for the new candidate cell is satisfied.

In various embodiments, a CHO candidate cell ID may be generated by concatenating frequency information (e.g., a band index, an absolute radio frequency channel number (ARFCN)) and a cell ID (e.g., a physical cell ID (PCI)) of a candidate cell, may be generated by concatenating the PCI of the candidate cell and an ID of a target node related to the candidate cell, or may be generated by concatenating the frequency information, the ID of the target node related to the candidate cell, and the PCI of the candidate cell. In this case, in order to determine whether to store the candidate cell ID and/or the candidate cell configuration related thereto, a UE may compare concatenated values of a candidate cell ID given in an RRC reconfiguration message with concatenated values of the candidate cell ID stored in the UE, respectively, and if all the compared values are the same, the UE may determine that the candidate cell ID stored in the UE and the candidate cell ID in the RRC reconfiguration message are the same.

In another embodiment, a serving node may assign any one integer value as a CHO candidate cell ID, on the basis of the cell ID, the target node ID, and the frequency information.

In various embodiments, a cell group ID (CGI) value may be used as a candidate cell ID. If the candidate cell ID is generated based on the PCI and ARFCN, when the UE releases the candidate cell, the UE may release a configuration of a candidate cell in which the concatenation of the cell ID and the ARFCN matches. According to an embodiment, if a PCI value is indicated to the UE, the UE may release any candidate cell corresponding to the indicated PCI value, regardless of an ARFCN value. According to another embodiment, if an ARFCN value is indicated to the UE, the UE may not release any candidate cell corresponding to the indicated ARFCN value, regardless of an PCI value.

In various embodiments, if a candidate cell ID is generated based on the PCI and the target node ID, when the UE releases the candidate cell, the UE may release a configuration of a candidate cell in which the concatenation of the PCI and the target node ID matches. According to an embodiment, if a PCI value is indicated to the UE, the UE may release any candidate cell corresponding to the indicated PCI value, regardless of a target node ID value. According to another embodiment, if a target node ID value is indicated to the UE, the UE may not release any candidate cell corresponding to the indicated target node ID value, regardless of a PCI value.

In various embodiments, a candidate cell ID may be generated based on a concatenation of the PCI and the ARFCN, a concatenation of the PCI and the target node ID, or a concatenation of the PCI, the ARFCN and the target node ID. In this case, the serving node may generate a random integer corresponding to each concatenated PCI, ARFCN and/or target node ID. The serving node may determine a total size of the candidate cell ID and may determine a size of a bit stream, which corresponds to each PCI, ARFCN and/or target node ID, for a hard split. For example, if each of a bit size of the PCI, a bit size of the ARFCN, and a bit size of the target node ID is defined as 5:5:5, one random integer value assigned from a PCI ID may be represented as a bit stream in first 5 bits, one random integer value assigned from the ARFCN may be represented as a bit stream in middle 5 bits, and one random integer value based on the target node ID may be represented as a bit stream in last 5 bits. For example, if each of the PCI, ARFCN, and target node ID has integer values of 2:5:3, the bit streams may be displayed as a concatenation of 00010:00101:00011.

In various embodiments, for each concatenation, when a base station transmits a release signal to the UE, if each of the PCI, ARFCN, and target node ID or the integer values thereof are provided, the UE may release a candidate cell of any candidate cell ID including the provided ID.

In the FIG. 9, a number of entities and various operations of each entity are described, but these are only mentioned to faithfully describe the handover process. That is, it does do not mean that a specific entity must need to perform all of the operations of the specific entity illustrated in FIG. 9. Some operations may be omitted or may be performed intermittently in describing certain embodiments of the present disclosure. For example, steps 915 to 923 may be omitted.

Figure 10:
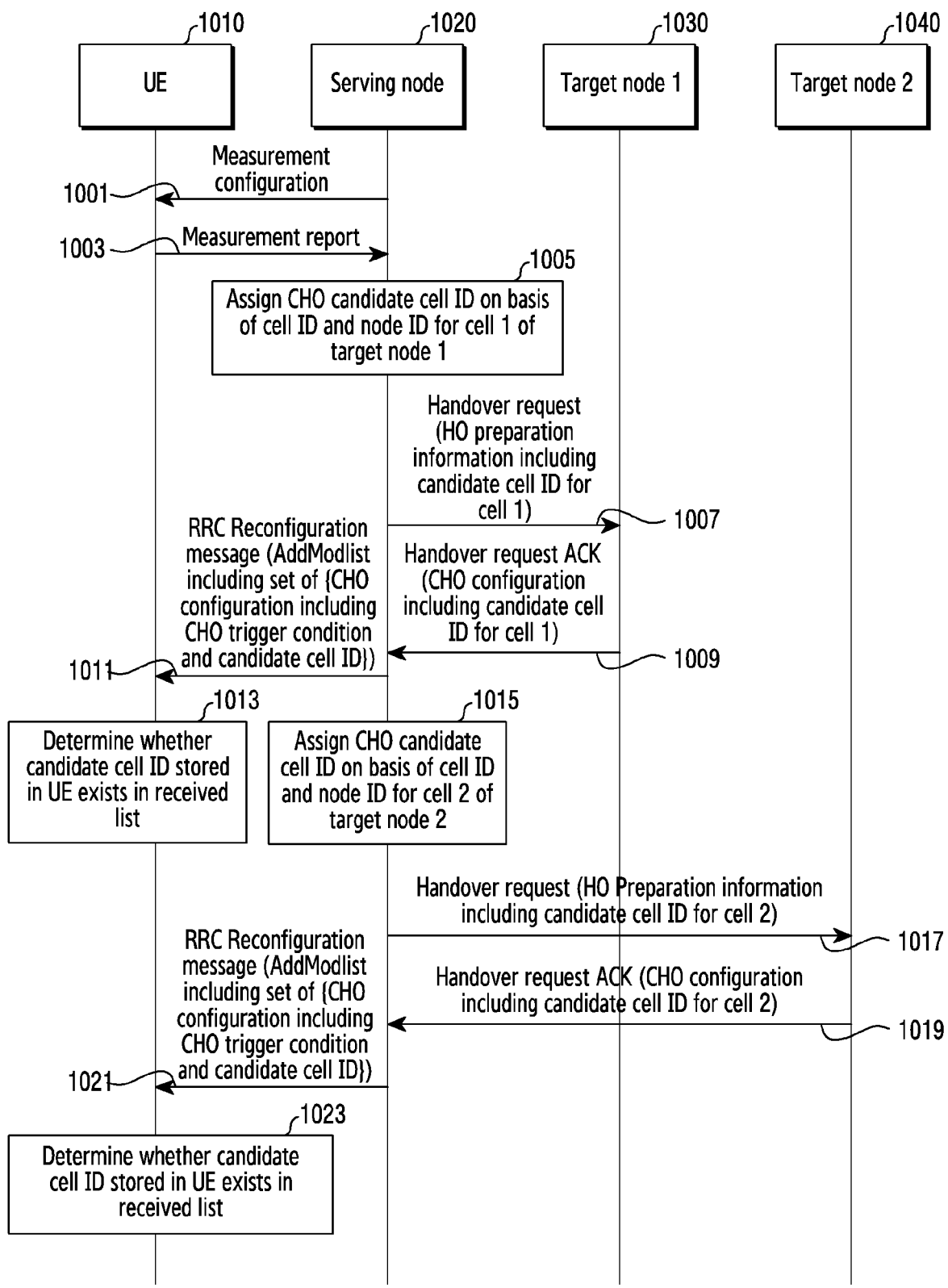
FIG. 10 illustrates an example of a case in which a serving node assigns a CHO candidate cell ID and then transmits a handover request message to a target node in the wireless communication system according to various embodiments.

FIG. 10 illustrates an example of a case in which a serving node assigns a CHO candidate cell ID and then transmits a handover request message to a target node in the wireless communication system according to various embodiments. In FIG. 10, a UE 1010 may be the terminal 120, and a serving node 1020 may be the base station 110. Each of target node 1 1030 and target node 2 1040 may have the elements of the base station 110 illustrated in FIG. 2.

Referring to FIG. 10, in operation 1001, the UE 1010 may receive a measurement configuration from the serving node 1020. For example, the UE 1010 may be connected to a serving cell and may receive a measurement configuration from the serving node 1020 related to the serving cell.

In operation 1003, the UE 1010 may transmit a measurement report to the serving node 1020. The UE 1010 may perform measurement based on the measurement configuration and may transmit the measurement report including a measurement result to the serving node 1020.

In operation 1005, the serving node 1020 may assign a CHO candidate cell ID on the basis of a node ID and a cell ID for cell 1 of target node 1 1030. For example, the serving node 1020 may assign a CHO candidate cell ID by using information related to an ID of target node 1 1030 and/or information related to an ID of a target cell (e.g., cell 1). The CHO candidate cell ID assigned in operation 1005 may be an ID for cell 1 of the target node 1 1030. In other words, unlike in FIG. 9, the serving node 1020 may assign a candidate cell ID before transmitting a handover request message.

In operation 1007, the serving node 1020 may transmit a HANDOVER REQUEST message to target node 1 1030. For example, the serving node 1020 may transmit the HANDOVER REQUEST message for requesting a CHO to target node 1 1030 related to at least one cell, on the basis of the measurement result. In various embodiments, the HANDOVER REQUEST message may include handover (HO) preparation information. The HANDOVER REQUEST message may further include a candidate cell ID for cell 1 of target node 1 1030.

In operation 1009, target node 1 1030 may transmit a handover request acknowledgment (ACK) message to the serving node 1020. Target node 1 1030 may reserve a resource to be used by the UE 1010 and may transmit the HANDOVER REQUEST ACK message including CHO configuration information for cell 1 of target node 1 1030 to the serving node 1020. The HANDOVER REQUEST ACK message may further include the candidate cell ID for cell 1 of target node 1 1030. In various embodiments, the candidate cell ID for cell 1 may be included in the CHO configuration information for cell 1.

In operation 1011, the serving node 1020 may transmit an RRC reconfiguration message to the UE 1010. The RRC reconfiguration message of operation 1011 may include a list of one or more candidate cell configurations, and each candidate cell configuration may include a candidate cell ID and a CHO configuration for each candidate cell including a CHO trigger condition. In various embodiments, the list of candidate cell configurations may be referred to as "Add-Modlist". In various embodiments, for the list of candidate cell configurations, the UE 1010 may, based on a candidate cell ID, i) correct a candidate cell configuration for a candidate cell ID which the UE 1010 already has, and ii) enable a candidate cell configuration for a candidate cell ID, which the UE 1010 does not have, to be stored in the UE 1010.

In operation 1013, the UE 1010 may determine whether a candidate cell ID stored in the UE 1010 exists in the received list. If the candidate cell ID stored in the UE 1010 exists in the received list, the UE 1010 may update a CHO configuration and a CHO trigger condition for the candidate cell ID stored in the UE 1010, with a CHO configuration and a CHO trigger condition for the corresponding candidate cell ID in the list of received candidate cell configurations. In other words, if the candidate cell ID stored in the UE 1010 exists in the received list, the UE 1010 may update the candidate cell configuration related to the candidate cell ID stored in the UE 1010, with the received candidate cell configuration related to the corresponding candidate cell ID.

In various embodiments, for the list received from the serving node 1020 may include: i) all candidate cell configurations for all candidate cells regardless of candidate cell configurations to be changed; ii) candidate cell configurations to be changed based on the configuration of the UE 1010 currently used in the serving cell; or iii) candidate cell configurations changed based on previously transmitted candidate cell configurations. When the UE 1010 updates the candidate cell configuration, if the candidate cell ID stored in the UE 1010 exists in the received list, the following operations of A), B) or C) may be performed for the cases of i), ii), and iii), respectively. A) The UE 1010 may delete the candidate cell configuration for the corresponding candidate cell ID stored in the UE 1010 and may store the received candidate cell configuration related to the corresponding candidate cell ID. B) With respect to the candidate cell configuration for the corresponding candidate cell ID stored in the UE 1010, the UE 1010 may change, to the received configuration information, configuration information different from the candidate cell configuration related to the currently stored corresponding candidate cell ID in comparison with the configuration updated to the received candidate cell configuration on the basis of the configuration of the UE being used in the current serving cell, or the UE 910 may newly add and store the received configuration information. C) The UE 1010 may change, to the received configuration information, configuration information different from the currently received candidate cell configuration among previously received candidate cell configurations, or may newly add and store the received configuration information.

If a candidate cell configuration having a candidate cell ID differing from the candidate cell ID stored in the UE 1010 exists in the list of the candidate cell configurations received from the serving node 1020, the UE 1010 may store a candidate cell configuration for a new candidate cell ID (e.g., a CHO configuration and a CHO trigger condition), may perform measurement on a new candidate cell on the basis of the candidate cell configuration, and may evaluate whether a CHO trigger condition for the new candidate cell is satisfied.

In operation 1015, the serving node 1020 may assign a CHO candidate cell ID on the basis of a node ID and a cell ID for cell 2 of target node 2 1040. For example, the serving node 1020 may assign a CHO candidate cell ID by using information related to an ID of target node 2 1040 and/or information related to an ID of a target cell (e.g., cell 2). The CHO candidate cell ID assigned in operation 1015 may be an ID for cell 2 of the target node 2 1040. In other words, unlike in FIG. 9, the serving node 1020 may assign a candidate cell ID before transmitting a handover request message.

In operation 1017, the serving node 1020 may transmit a HANDOVER REQUEST message to target node 2 1040. For example, the serving node 1020 may transmit the HANDOVER REQUEST message for requesting a CHO to target node 2 1040 related to at least one cell, on the basis of the measurement result. In various embodiments, the HANDOVER REQUEST message may include handover (HO) preparation information. The HANDOVER REQUEST message may further include a candidate cell ID for cell 2 of target node 2 1040.

In operation 1019, target node 2 1040 may transmit a handover request acknowledgment (ACK) message to the serving node 1020. Target node 2 1040 may reserve a resource to be used by the UE 1010 and may transmit the HANDOVER REQUEST ACK message including CHO configuration information for cell 2 of target node 2 1040 to the serving node 1020. The HANDOVER REQUEST ACK message may further include the candidate cell ID for cell 2 of target node 2 1040. In various embodiments, the candidate cell ID for cell 2 may be included in the CHO configuration information for cell 2.

In operation 1011, the serving node 1020 may transmit an RRC reconfiguration message to the UE 1010. The RRC reconfiguration message of operation 1011 may include a list of one or more candidate cell configurations, and each candidate cell configuration may include a candidate cell ID and a CHO configuration for each candidate cell including a CHO trigger condition. In various embodiments, the list of candidate cell configurations may be referred to as "Add-Modlist".

In operation 1013, the UE 1010 may determine whether a candidate cell ID stored in the UE 1010 exists in the received list. If the candidate cell ID stored in the UE 1010 exists in the received list, the UE 1010 may update a CHO configuration and a CHO trigger condition for the candidate cell ID stored in the UE 1010, with a CHO configuration and a CHO trigger condition for the corresponding candidate cell ID in the list of received candidate cell configurations. In other words, if the candidate cell ID stored in the UE 1010 exists in the received list, the UE 1010 may update the candidate cell configuration related to the candidate cell ID stored in the UE 1010, with the received candidate cell configuration related to the corresponding candidate cell ID.

In various embodiments, for the list received from the serving node 1020 may include: i) all candidate cell configurations for all candidate cells regardless of candidate cell configurations to be changed; ii) candidate cell configurations to be changed based on the configuration of the UE 1010 currently used in the serving cell; or iii) candidate cell configurations changed based on previously transmitted candidate cell configurations. When the UE 1010 updates the candidate cell configuration, if the candidate cell ID stored in the UE 1010 exists in the received list, the following operations of A), B) or C) may be performed for the cases of i), ii), and iii), respectively. A) The UE 1010 may delete the candidate cell configuration for the corresponding candidate cell ID stored in the UE 1010 and may store the received candidate cell configuration related to the corresponding candidate cell ID. B) With respect to the candidate cell configuration for the corresponding candidate cell ID stored in the UE 1010, the UE 1010 may change, to the received configuration information, configuration information different from the candidate cell configuration related to the currently stored corresponding candidate cell ID in comparison with the configuration updated to the received candidate cell configuration on the basis of the configuration of the UE being used in the current serving cell, or the UE 910 may newly add and store the received configuration information. C) The UE 1010 may change, to the received configuration information, configuration information different from the currently received candidate cell configuration among previously received candidate cell configurations, or may newly add and store the received configuration information.

If a candidate cell configuration having a candidate cell ID differing from the candidate cell ID stored in the UE 1010 exists in the list of the candidate cell configurations received from the serving node 1020, the UE 1010 may store a candidate cell configuration for a new candidate cell ID (e.g., a CHO configuration and a CHO trigger condition), may perform measurement on a new candidate cell on the basis of the candidate cell configuration, and may evaluate whether a CHO trigger condition for the new candidate cell is satisfied.

In the FIG. 10, a number of entities and various operations of each entity are described, but these are only mentioned to faithfully describe the handover process. That is, it does do not mean that a specific entity must need to perform all of the operations of the specific entity illustrated in FIG. 10. Some operations may be omitted or may be performed intermittently in describing certain embodiments of the present disclosure.

Figure 11:
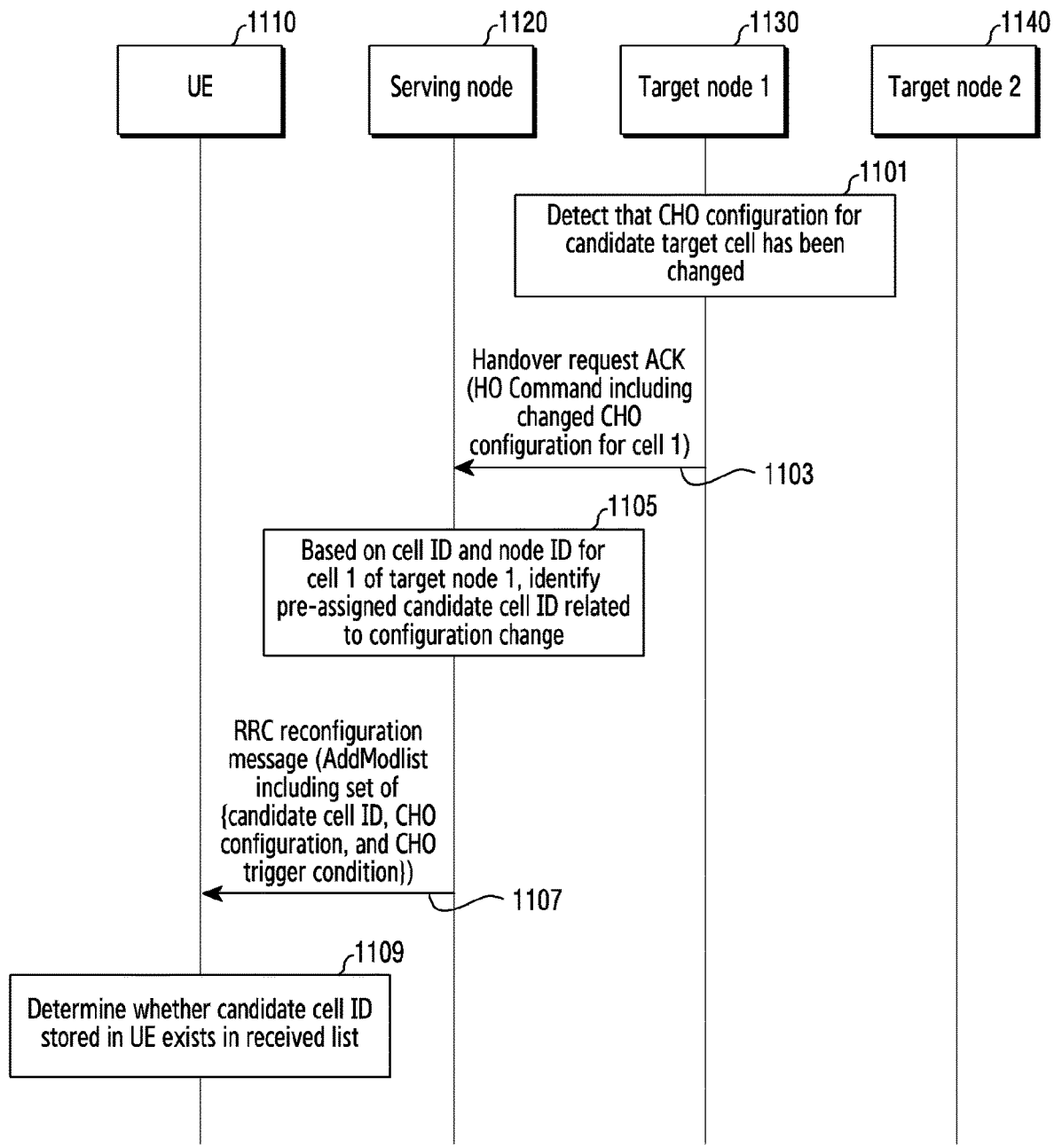
FIG. 11 illustrates an example of a case of modifying a candidate cell configuration by using a candidate cell ID in the wireless communication system according to various embodiments.

FIG. 11 illustrates an example of a case of modifying a candidate cell configuration by using a candidate cell ID in the wireless communication system according to various embodiments. In FIG. 11, a UE 1110 may be the terminal 120, and a serving node 1120 may be the base station 110. Each of target node 1 1130 and target node 2 1140 may have the elements of the base station 110 illustrated in FIG. 2.

Referring to FIG. 11, in operation 1101, target node 1 1130 detects that a CHO configuration for a candidate target cell has been changed. The candidate target cell may be cell 1 of target node 1 1130. If a resource configuration for a previously reserved resource is changed, target node 1 1130 may identify a UE to which a corresponding resource is assigned and a serving node of the UE. In an example of FIG. 11, the UE to which the corresponding resource is assigned and the serving node of the UE may be the UE 1110 and the serving node 1120, respectively.

In operation 1103, target node 1 1130 may transmit a HANDOVER REQUEST ACK message or a CHO configuration update request message to the serving node 1120. In various embodiments, the HANDOVER REQUEST ACK message or the CHO configuration update request message may include a handover (HO) command, and the HO command may include a CHO configuration for cell 1, which includes a changed resource configuration. Furthermore, the HANDOVER REQUEST ACK message or the CHO configuration update request message may include a candidate cell ID related to the changed CHO configuration (in the example of FIG. 11, the candidate cell ID for cell 1). In other words, in operation 1103, target node 1 1130 may transmit information including at least one of the CHO configuration for cell 1 including the changed resource configuration or the candidate cell ID related to the changed CHO configuration to the serving node 1120, and the information may be transmitted via a HANDVOER REQUEST message or other message.

In operation 1105, the serving node 1120 may identify the candidate cell ID related to the changed CHO configuration, based on the cell ID and node ID for cell 1 of target node 1 1130. The serving node 1120 may identify the candidate cell ID of the candidate cell, the CHO configuration of which has been changed, and the changed CHO configuration.

In operation 1117, the serving node 1120 may transmit an RRC reconfiguration message to the UE 1110. The RRC reconfiguration message may include a list of one or more candidate cell configurations, and each candidate cell configuration may include a candidate cell ID related to a changed CHO configuration, the changed CHO configuration, and/or a CHO trigger condition for a candidate cell of the candidate cell ID.

In operation 1109, the UE 1110 may determine whether a candidate cell ID stored in the UE 1110 exists in a received list. For example, the UE 1110 may compare a candidate cell ID stored in the UE 1110 with the received list to determine whether a candidate cell configuration having the same candidate cell ID is identified. If a candidate cell configuration having the same candidate cell ID is identified, the UE 1110 may identify a CHO trigger condition and/or a CHO configuration different from the candidate cell configuration pre-stored in the UE 1110, in the received candidate cell configuration for the corresponding candidate cell ID, may update the pre-stored candidate cell configuration for the corresponding candidate cell ID with the identified CHO configuration and/or CHO trigger condition, and may store the updated CHO configuration and/or CHO trigger condition. Furthermore, the UE 1110 may perform measurement for the candidate cell on the basis of the updated candidate cell configuration and may evaluate whether the CHO trigger condition for the candidate cell is satisfied.

In the FIG. 11, a number of entities and various operations of each entity are described, but these are only mentioned to faithfully describe the handover process. That is, it does do not mean that a specific entity must need to perform all of the operations of the specific entity illustrated in FIG. 11. Some operations may be omitted or may be performed intermittently in describing certain embodiments of the present disclosure.

Figure 12:
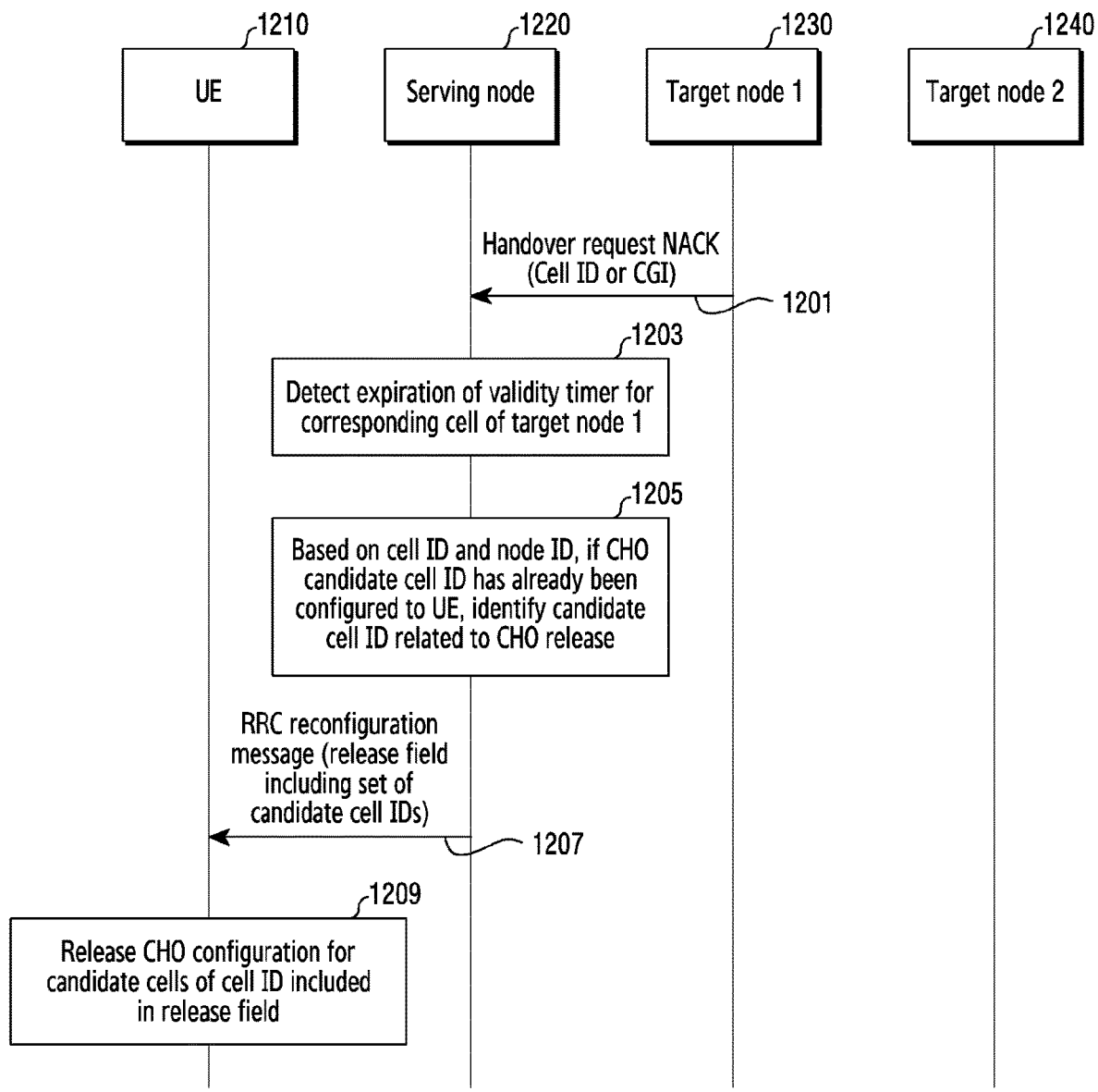
FIG. 12 illustrates an example of a case of releasing a candidate cell configuration on the basis of a candidate cell ID in the wireless communication system according to various embodiments.

FIG. 12 illustrates an example of a case of releasing a candidate cell configuration on the basis of a candidate cell ID in the wireless communication system according to various embodiments. In FIG. 12, a UE 1210 may be the terminal 120, and a serving node 1220 may be the base station 110. Each of target node 1 1230 and target node 2 1240 may have the elements of the base station 110 illustrated in FIG. 2. In FIG. 12, it is assumed that a CHO candidate cell configuration for a candidate target cell has been previously transferred to the UE 1210.

Referring to FIG. 12, in operation 1201, target node 1 1230 may transmit a HANDOVER REQUEST negative ACK (NACK) message or a message for requesting release of a preconfigured HO configuration to the serving node 1220. For example, in response to reception of a HANDOVER REQUEST message from the serving node 1220, target node 1 1230 may transmit, to the serving node 1220, the HANDOVER REQUEST NACK message including a candidate cell ID or a cell group identifier (CGI) or a message for requesting release of the preconfigured HO configuration. When the HANDOVER REQUEST NACK message or the message for requesting release of the preconfigured HO configuration and/or a handover cancellation command are received from target node 1 1230, the serving node 1220 may release a candidate cell configuration for a received candidate cell ID.

In operation 1203, the serving node 1220 may detect expiration of a validity timer for a candidate cell of target node 1 1230. In various embodiments, the validity timer may count a time when resource assignment for a candidate cell for a CHO is valid. If the expiration of the validity timer for the candidate cell is detected, the serving node 1220 may release the candidate cell configuration for the candidate cell.

In various embodiments, operations 1201 and 1203 may be selectively performed. In this case, operation 1201 or operation 1203 may be omitted.

In operation 1205, the serving node 1220 may identify a candidate cell ID related to a CHO configuration to be released when a CHO candidate cell ID is already configured to the UE 1210, on the basis of a cell ID and a node ID. In other words, the serving node 1220 may identify the candidate cell ID related to the candidate cell configuration to be released.

In operation 1207, the serving node 1220 may transmit an RRC reconfiguration message to the UE 1210. In various embodiments, the RRC reconfiguration message may include a release field including a list of one or more candidate cell IDs for one or more candidate cell configurations to be released. In other words, the serving node 1220 may transmit, to the UE 1210, information including a candidate cell ID related to a candidate cell configuration to be released and an indicator indicating to release the candidate cell configuration for the candidate cell ID.

In operation 1209, the UE 1210 may release CHO configurations for candidate cells of the cell ID included in the release field. The UE 1210 may stop measurement for evaluating a CHO trigger condition and a CHO trigger condition of the released candidate cell, and may release the candidate cell configuration. In other words, the UE 1210 may release one or more candidate cell configurations for the received one or more candidate cell IDs.

In the FIG. 12, a number of entities and various operations of each entity are described, but these are only mentioned to faithfully describe the handover process. That is, it does do not mean that a specific entity must need to perform all of the operations of the specific entity illustrated in FIG. 12. Some operations may be omitted or may be performed intermittently in describing certain embodiments of the present disclosure.

Figure 13:
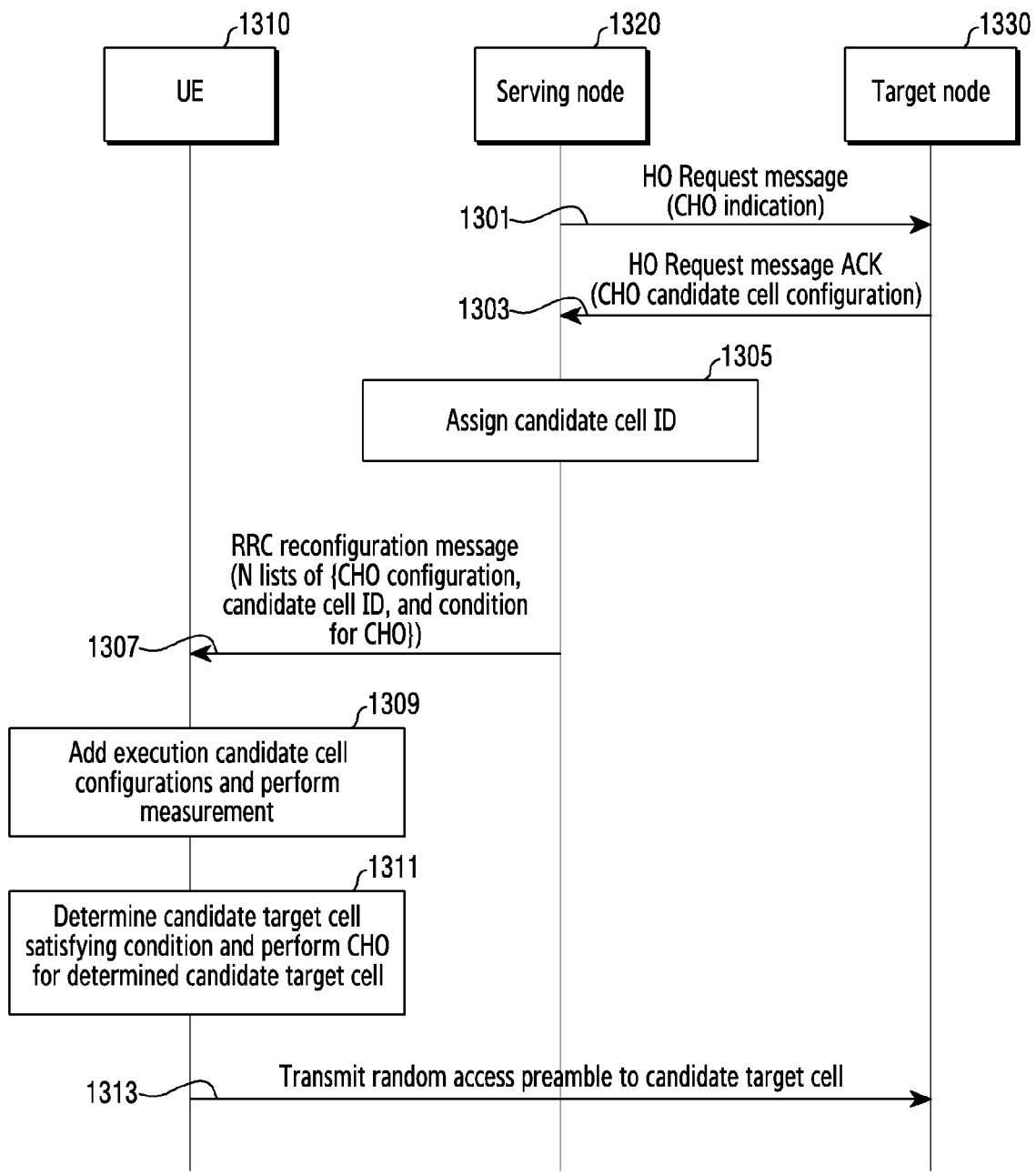
FIG. 13 illustrates an example of a case of releasing a candidate cell configuration when a CHO is performed in the wireless communication system according to various embodiments.

FIG. 13 illustrates an example of a case of releasing a candidate cell configuration when a CHO is performed in the wireless communication system according to various embodiments. In FIG. 13, a UE 1310 may be the terminal 120, and a serving node 1320 may be the base station 110. Target node 1330 may have the configurations of the base station 110 illustrated in FIG. 2.

Referring to FIG. 13, in operation 1301, the serving node 1320 may transmit an HO request message including a CHO indication to target node 1330. In various embodiments, the CHO indication may indicate, to the target node, that the HO request is a request for a CHO.

In operation 1303, the target node 1330 may transmit an HO request message ACK message to the serving node 1320. In various embodiments, the HO request message ACK may include one or more CHO configurations for one or more candidate cells of the target node 1330 for CHO. Furthermore, the HO request message ACK may include one or more CHO trigger conditions for one or more candidate cells of the target node 1330 for CHO.

In operation 1305, the serving node 1320 may assign a candidate cell ID. For example, the serving node 1320 may assign a candidate cell ID for the candidate cell, on the basis of a target node ID and/or a cell ID in the CHO configuration received in operation 1303.

In operation 1307, the serving node 1320 may transmit an RRC reconfiguration message to the UE 1310. The RRC reconfiguration message may include a list of one or more candidate cell configurations, and each candidate cell configuration may include a candidate cell ID, and a CHO configuration and a CHO trigger condition for the candidate cell ID, which are received from the target node 1330.

In operation 1309, the UE 1310 may add, to a list of the UE 1310, candidate cell configurations related to candidate cell IDs that are not stored in the UE 1310 from the received list of candidate cell configurations, and may perform, based on the candidate cell configurations, measurement for candidate cells of corresponding candidate cell IDs.

In operation 1311, the UE 1310 may determine a candidate target cell that satisfies the CHO trigger condition, and may perform a CHO for the determined candidate target cell. More specifically, as a result of the measurement in operation 1309, if the CHO trigger condition is satisfied for one or more candidate cells at a specific time point, the UE 1310 may select one target cell from among the one or more candidate cells, for which the condition is satisfied, and may perform the CHO to the selected target cell. In this case, the UE 1310 may perform the CHO to a target cell by applying the candidate cell configuration for the target cell, and may release candidate cell configurations (e.g., CHO configurations and CHO trigger conditions) for candidate cells other than the target cell.

In operation 1313, the UE 1310 may transmit a random access preamble to the target cell of the target node 1330. The UE 1310 may initiate a random access procedure by transmitting the random access preamble to the target cell to establish uplink synchronization for the target cell.

In the FIG. 13, a number of entities and various operations of each entity are described, but these are only mentioned to faithfully describe the handover process. That is, it does do not mean that a specific entity must need to perform all of the operations of the specific entity illustrated in FIG. 13. Some operations may be omitted or may be performed intermittently in describing certain embodiments of the present disclosure.

Figure 14:
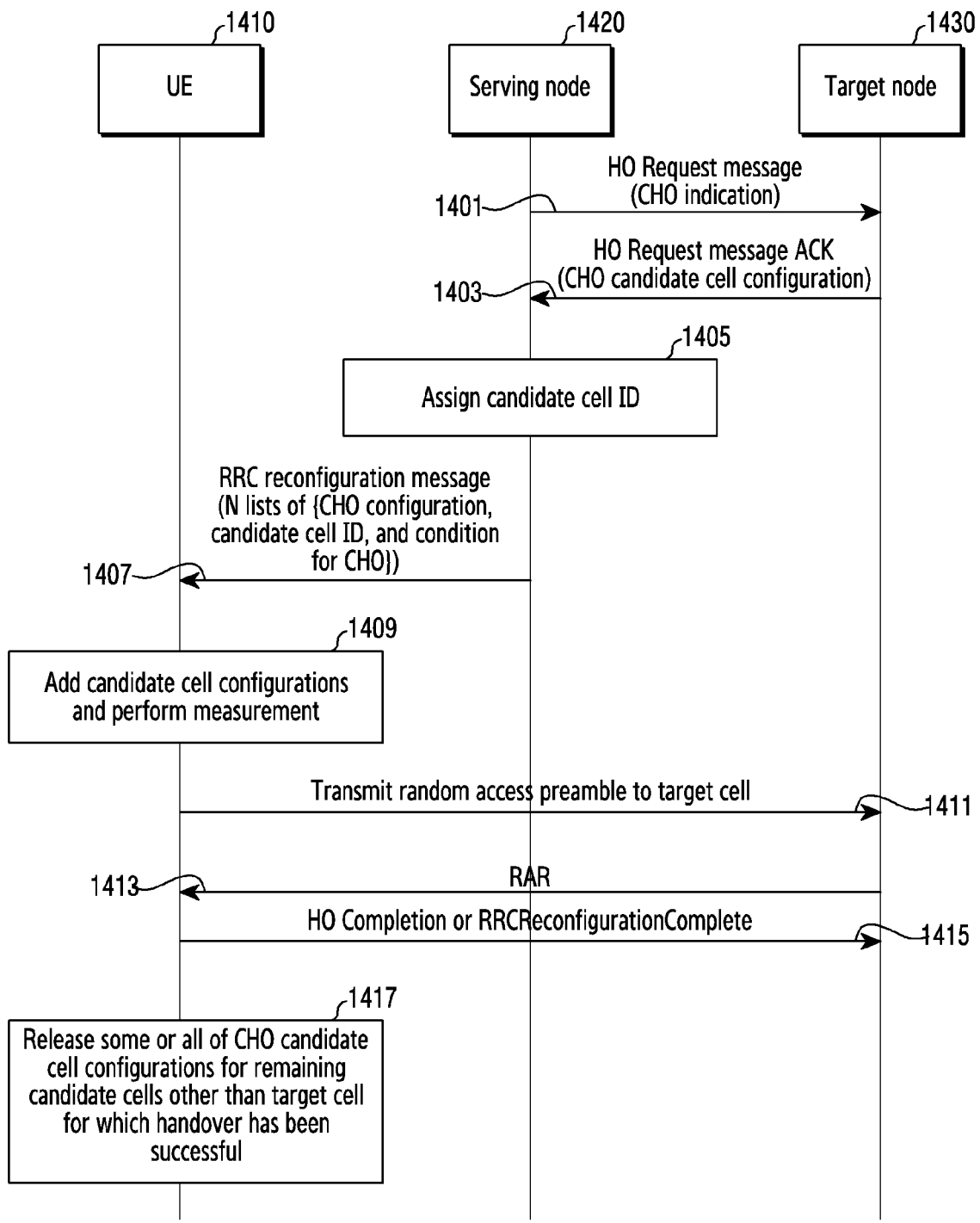
FIG. 14 illustrates an example of a case of releasing a candidate cell configuration after a CHO is successfully performed in the wireless communication system according to various embodiments.

FIG. 14 illustrates an example of a case of releasing a candidate cell configuration after a CHO is successfully performed in the wireless communication system according to various embodiments. In FIG. 14, a UE 1410 may be the terminal 120, and a serving node 1420 may be the base station 110. Target node 1430 may have the configurations of the base station 110 illustrated in FIG. 2.

Referring to FIG. 14, in operation 1401, the serving node 1420 may transmit an HO request message including a CHO indication to the target node 1430. In various embodiments, the CHO indication may include an indicator indicating that a CHO will be performed.

In operation 1403, the target node 1430 may transmit an HO request message ACK message to the serving node 1420. In various embodiments, the HO request message ACK may include one or more CHO configurations for one or more candidate cells of the target node 1430 for CHO. Furthermore, the HO request message ACK may include one or more CHO trigger conditions for one or more candidate cells of the target node 1430 for CHO.

In operation 1405, the serving node 1420 may assign a candidate cell ID. For example, the serving node 1420 may assign a candidate cell ID for the candidate cell, on the basis of a target node ID and/or a cell ID in the CHO configuration received in operation 1403.

In operation 1407, the serving node 1420 may transmit an RRC reconfiguration message to the UE 1410. The RRC reconfiguration message may include a list of one or more candidate cell configurations, and each candidate cell configuration may include a candidate cell ID, and a CHO configuration and a CHO trigger condition for the candidate cell ID, which are received from the target node 1430.

In operation 1409, the UE 1410 may add, to a list of the UE 1410, candidate cell configurations related to candidate cell IDs that are not stored in the UE 1410 from the received list of candidate cell configurations, and may perform, based on the candidate cell configurations, measurement for candidate cells of corresponding candidate cell IDs. As a result of the measurement, if the CHO trigger condition is satisfied for one or more candidate cells at a specific time point, the UE 1410 may select one target cell from among the one or more candidate cells, for which the condition is satisfied, and may perform the CHO to the selected target cell. In this case, the UE 1410 may perform the CHO to the target cell by applying a candidate cell configuration for the target cell.

In operation 1411, the UE 1410 may transmit a random access preamble to the target cell of the target node 1430. The UE 1410 may initiate a random access procedure by transmitting the random access preamble to the target cell to establish uplink synchronization for the target cell.

In operation 1413, the target node 1430 may transmit a random access response (RAR) message to the UE 1410. The RAR message may include a random access preamble detected by the target node 1430 and an uplink grant (UL grant).

In operation 1415, the UE 1410 may transmit an HO completion or RRC reconfiguration completion (RRCReconfigurationComplete) message to the target node 1430. After completing the handover to the target node 1430, the UE 1410 may transmit the HO completion or RRC reconfiguration completion (RRCReconfigurationComplete) message to the target node 1430.

In operation 1417, the UE 1410 may release some or all of CHO candidate cell configurations for the remaining candidate cells other than the target cell for which that handover has been successful. More specifically, if the CHO to the target cell by the UE 1410 is successful, the UE 1410 may release some or all of the CHO candidate cell configurations for the remaining candidate cells other than the target cell for which the CHO has been successful. In various embodiments, the success of a handover may correspond to transmission of an RRC reconfiguration completion (RRCReconfigurationComplete) message.

In the FIG. 14, a number of entities and various operations of each entity are described, but these are only mentioned to faithfully describe the handover process. That is, it does do not mean that a specific entity must need to perform all of the operations of the specific entity illustrated in FIG. 14. Some operations may be omitted or may be performed intermittently in describing certain embodiments of the present disclosure.

According to embodiments, a method performed by a user equipment (UE) in a wireless communication system, the method comprises: receiving, from a base station, a radio resource control (RRC) reconfiguration message including conditional configuration information, and a configuration of the candidate cell; and performing one or more operations for a conditional handover based on RRC reconfiguration message. The conditional configuration information includes: identification information for a candidate cell.

In some embodiments, the conditional configuration information further includes information on a condition for triggering an execution of the configuration of the candidate cell, and the performing of the one or more operations for the conditional handover comprises evaluating the condition.

In some embodiments, the performing of the one or more operations for the conditional handover comprises: based on identifying that the condition is met based on a measurement result, applying the conditional configuration.

In some embodiments, the method further comprises identifying whether the identification information for the candidate cell exists in a list stored in the UE; and if the identification information for the candidate cell does not exist in a list stored in the UE, storing the conditional configuration information.

In some embodiments, the method further comprises, if the identification information for the candidate cell exists in the list stored of the UE, replacing one configuration of the candidate cell stored in the UE with the received configuration of the candidate cell.

In some embodiments, the method further comprises, if the identification information for the candidate cell exists in the list stored of the UE, replacing one condition of the candidate cell stored in the UE with a condition for triggering an execution of the configuration of the candidate cell. The conditional configuration information further includes information on the condition.

In some embodiments, the method further comprises, receiving, from the base station, an RRC reconfiguration message including information on a release list including identification information for another candidate cell; if the identification information for another candidate cell exists in the list stored of the UE, releasing a conditional configuration corresponding to the identification information for another candidate cell.

In some embodiments, the RRC reconfiguration message includes an addition/modification list for one or more conditional configuration information, and the addition/modification list includes the conditional configuration information.

According to embodiments, a method performed by a base station in a wireless communication system, comprises generating a radio resource control (RRC) reconfiguration message including conditional configuration information, wherein the conditional configuration information includes: identification information for a candidate cell; and a configuration of the candidate cell; and transmitting, to a user equipment (UE), a radio resource control (RRC) reconfiguration message for a conditional handover.

In some embodiments, the conditional configuration information further includes information on a condition for triggering an execution of the configuration of the candidate cell.

In some embodiments, the method further comprises, before generating the RRC reconfiguration message, transmitting, to a target base station providing the candidate cell, a handover request message, and before generating the RRC reconfiguration message, receiving, from the target base station, a handover request acknowledge message including the configuration of the candidate cell.

In some embodiments, the method further comprises: transmitting, to the UE, an RRC reconfiguration message including information on a release list including identification information for another candidate cell. A conditional configuration corresponding to the identification information for another candidate cell is released.

According to embodiments, a user equipment (UE) in a wireless communication system, comprising: at least one transceiver; and at least one processor configured to: receive, from a base station via the at least one transceiver, a radio resource control (RRC) reconfiguration message including conditional configuration information; and perform one or more operations for a conditional handover based on RRC reconfiguration message. The conditional configuration information includes: identification information for a candidate cell; and a configuration of the candidate cell.

In some embodiments, the conditional configuration information further includes information on a condition for triggering an execution of the configuration of the candidate cell, and the performing of the one or more operations for the conditional handover comprises evaluating the condition.

In some embodiments, the at least one processor is, in order to perform the one or more operations for the conditional handover, configured to, based on identifying that the condition is met based on a measurement result, apply the conditional configuration.

In some embodiments, the at least one processor is further configured to identify whether the identification information for the candidate cell exists in a list stored in the UE; and if the identification information for the candidate cell does not exist in a list stored in the UE, store the conditional configuration information.

In some embodiments, the at least one processor is further configured to, if the identification information for the candidate cell exists in the list stored of the UE, replace one configuration of the candidate cell stored in the UE with the received configuration of the candidate cell.

In some embodiments, the at least one processor is further configured to, if the identification information for the candidate cell exists in the list stored of the UE, replace one condition of the candidate cell stored in the UE with a condition for triggering an execution of the configuration of the candidate cell. The conditional configuration information further includes information on the condition.

In some embodiments, the at least one processor is further configured to receive, from the base station via the at least one transceiver, an RRC reconfiguration message including information on a release list including identification information for another candidate cell; and if the identification information for another candidate cell exists in the list stored of the UE, release a conditional configuration corresponding to the identification information for another candidate cell.

In some embodiments, the RRC reconfiguration message includes an addition/modification list for one or more conditional configuration information, and the addition/modification list includes the conditional configuration information.

According to embodiments, a base station in a wireless communication system, comprises at least one transceiver; and at least one processor configured to generate a radio resource control (RRC) reconfiguration message including conditional configuration information, wherein the conditional configuration information includes: identification information for a candidate cell; and a configuration of the candidate cell; and transmit, to a user equipment (UE) via the at least one transceiver, a radio resource control (RRC) reconfiguration message for a conditional handover.

In some embodiments, the conditional configuration information further includes information on a condition for triggering an execution of the configuration of the candidate cell.

In some embodiments, the at least one processor is, before generating the RRC reconfiguration message, further configured to: transmit, to a target base station providing the candidate cell via the at least one transceiver, a handover request message, and receive, from the target base station via the at least one transceiver, a handover request acknowledge message including the configuration of the candidate cell.

In some embodiments, the at least one processor is further configured to: transmit, to the UE via the at least one transceiver, an RRC reconfiguration message including information on a release list including identification information for another candidate cell. A conditional configuration corresponding to the identification information for another candidate cell is released.

According to embodiments, an operation method of a terminal in a wireless communication system, the method comprises receiving candidate cell configurations for one or more candidate cells for a conditional handover (CHO) from a base station; identifying a candidate cell identifier (ID) for each candidate cell in the candidate cell configurations; and based on the candidate cell ID, updating a candidate cell configuration corresponding to the candidate cell ID to a list of candidate cell configurations, which is stored in the terminal, wherein the candidate cell ID may be generated based on at least one of an ID of the base station or a cell ID of a candidate cell.

In some embodiments, the updating of the candidate cell configuration comprises: if the candidate cell ID is included in the list of candidate cell configurations, which is stored in the terminal, updating a candidate cell configuration related to the candidate cell ID in the list of candidate cell configurations stored in the terminal by using a candidate cell configuration received from the base station.

In some embodiments, the updating of the candidate cell configuration comprises: if the candidate cell ID is not included in the list of candidate cell configurations, which is stored in the terminal, adding the received candidate cell configurations to the list of candidate cell configurations stored in the terminal; based on the candidate cell configurations, performing measurement for a candidate cell of the candidate cell ID; and performing a handover to the candidate cell in response to that a result of the measurement satisfies a CHO trigger condition.

According to embodiments, an operation method of a base station in a wireless communication system, the method comprises based on at least one of an identifier (ID) of the base station or a cell ID of a candidate cell for a conditional handover (CHO), generating a candidate cell ID of the candidate cell; and transmitting, to a terminal, a candidate cell configuration comprising at least one of the candidate cell ID, a CHO configuration, or a CHO trigger condition, wherein at least one of the CHO configuration or the CHO trigger condition is received from an adjacent base station related to the candidate cell via a handover acknowledgment message for a handover request.

In some embodiments, the method further comprises: before generating the candidate cell ID, transmitting the handover request to the adjacent base station; and receiving the handover acknowledgment message comprising the CHO configuration from the adjacent base station.

In some embodiments, the method further comprises: transmitting the handover request comprising the candidate cell ID to the adjacent base station; and receiving the CHO configuration comprising the candidate cell ID from the adjacent base station via the handover acknowledgment message.

According to embodiments, a terminal in a wireless communication system, the terminal comprising: a transceiver configured to receive candidate cell configurations for one or more candidate cells for a conditional handover (CHO) from a base station; and at least one processor configured to identify a candidate cell identifier (ID) for each candidate cell in the candidate cell configurations, and update, based on the candidate cell ID, a candidate cell configuration corresponding to the candidate cell ID to a list of candidate cell configurations, which is stored in the terminal, wherein the candidate cell ID is generated based on at least one of an ID of the base station or a cell ID of a candidate cell.

In some embodiments, the at least one processor is configured to, if the candidate cell ID is included in the list of candidate cell configurations, which is stored in the terminal, update a candidate cell configuration related to the candidate cell ID in the list of candidate cell configurations stored in the terminal by using a candidate cell configuration received from the base station.

In some embodiments, the at least one processor is configured to: if the candidate cell ID is not included in the list of candidate cell configurations, which is stored in the terminal, add the received candidate cell configurations to the list of candidate cell configurations stored in the terminal; based on the candidate cell configurations, perform measurement for a candidate cell of the candidate cell ID; and perform a handover to the candidate cell in response to that a result of the measurement satisfies a CHO trigger condition.

Figure 15:
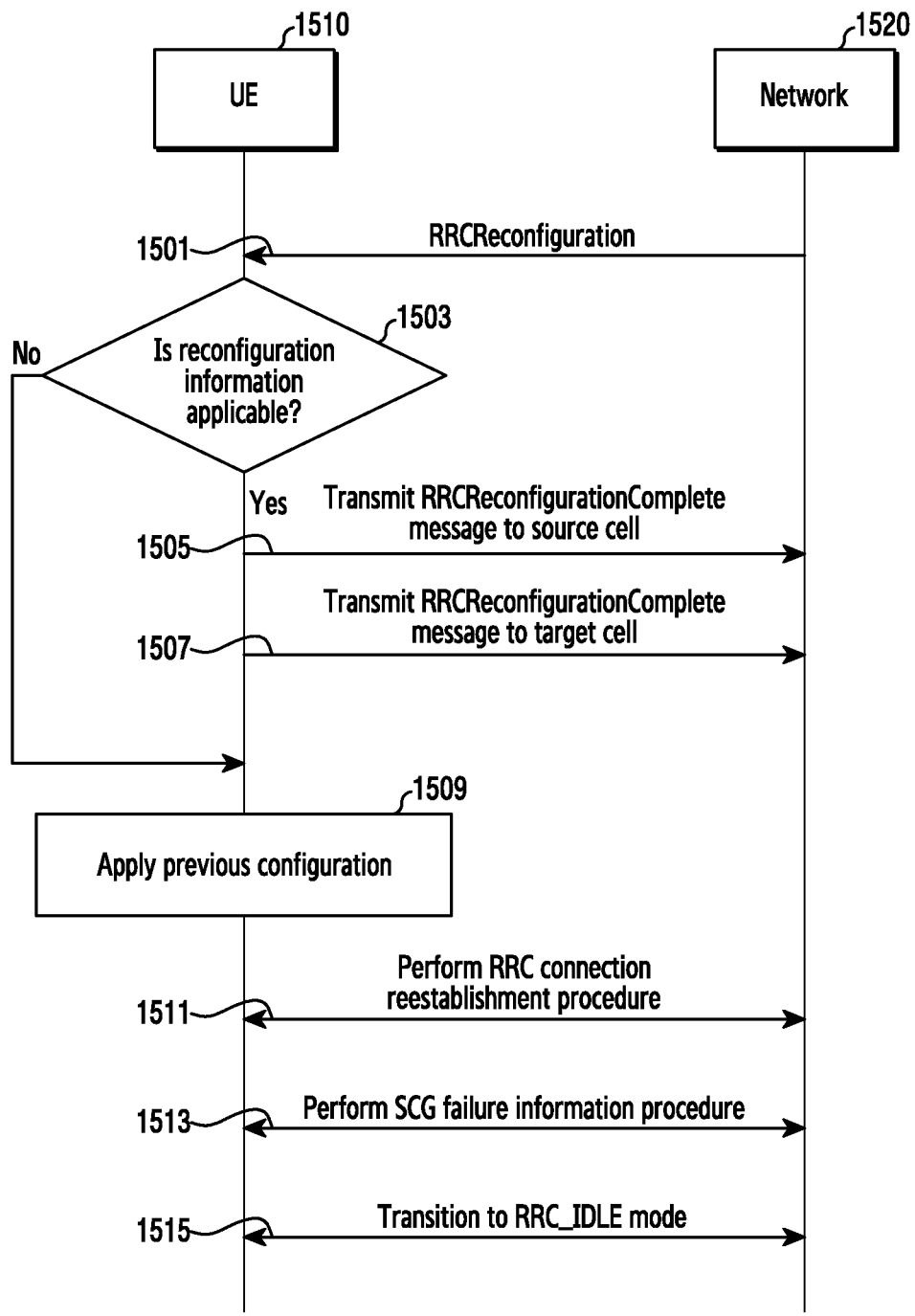
FIG. 15 illustrates an example of a case of performing an applicability check in the wireless communication system according to various embodiments.

FIG. 15 illustrates an example of a case of performing an applicability check in the wireless communication system according to various embodiments. In FIG. 15, a UE 1510 may be the terminal 120, and a network 1520 may include at least one base station (e.g., the base station 110). Each base station may have the configurations of the base station 110 illustrated in FIG. 2.

Referring to FIG. 15, in operation 1501, the UE 1510 may receive an RRC reconfiguration (RRCReconfiguration) message from the network 1520. The RRC reconfiguration message may include information for reconfiguration.

In operation 1503, the UE 1510 may determine whether received configuration information is applicable. In other words, the UE 1510 may perform an applicability check for the received reconfiguration information. The UE 1510 may determine whether the received reconfiguration information is applicable at a time point of applying the received reconfiguration information. If the reconfiguration information is applicable, the UE 1510 may perform operation 1505 or operation 1507. If the reconfiguration information is not applicable, the UE 1510 may perform operation 1511, operation 1513, or operation 1515.

In operation 1505, the UE 1510 may transmit an RRC reconfiguration completion (RRCReconfigurationComplete) message to the network 1520. If the received reconfiguration information is applicable, the UE 1510 may transmit the RRCReconfigurationComplete message to a source cell for a CHO.

In operation 1507, the UE 1510 may transmit the RRCReconfigurationComplete message to the network 1520. If the received reconfiguration information is applicable, and the UE 1510 receives a CHO command, the UE 1510 may transmit the RRCReconfigurationComplete message to a target cell for a Cho.

Operation 1505 and operation 1507 may be selectively performed. In other words, operation 1505 or operation 1507 may be omitted.

In operation 1509, the UE 1510 may apply a previous configuration. In other words, as a result of the applicability check, if the UE 1510 cannot apply all or a part of the received reconfiguration information, the UE 1510 may apply configuration information before reception of the reconfiguration information.

In operation 1511, the UE 1510 may perform an RRC connection re-establishment (RRE) procedure. In a state in which the configuration information before reception of the reconfiguration information has been applied, the UE 1510 may perform the RRC connection re-establishment procedure.

In operation 1513, the UE 1510 may perform a secondary cell group (SCG) failure information procedure. For example, if configuration or reconfiguration information related to a primary secondary cell (PSCell) is not applicable, the UE 1510 may perform the SCG failure information procedure.

In operation 1515, the UE 1510 may transition to an RRC IDLE mode. For example, if access stratum (AS) security is not applied, the UE 1510 may transition to the RRC IDLE mode.

Operations 1511, 1513, and 1515 may be selectively performed. In other words, one of operations 1511, 1513, and 1515 is performed, and the remaining operations may not be performed.

Figure 16:
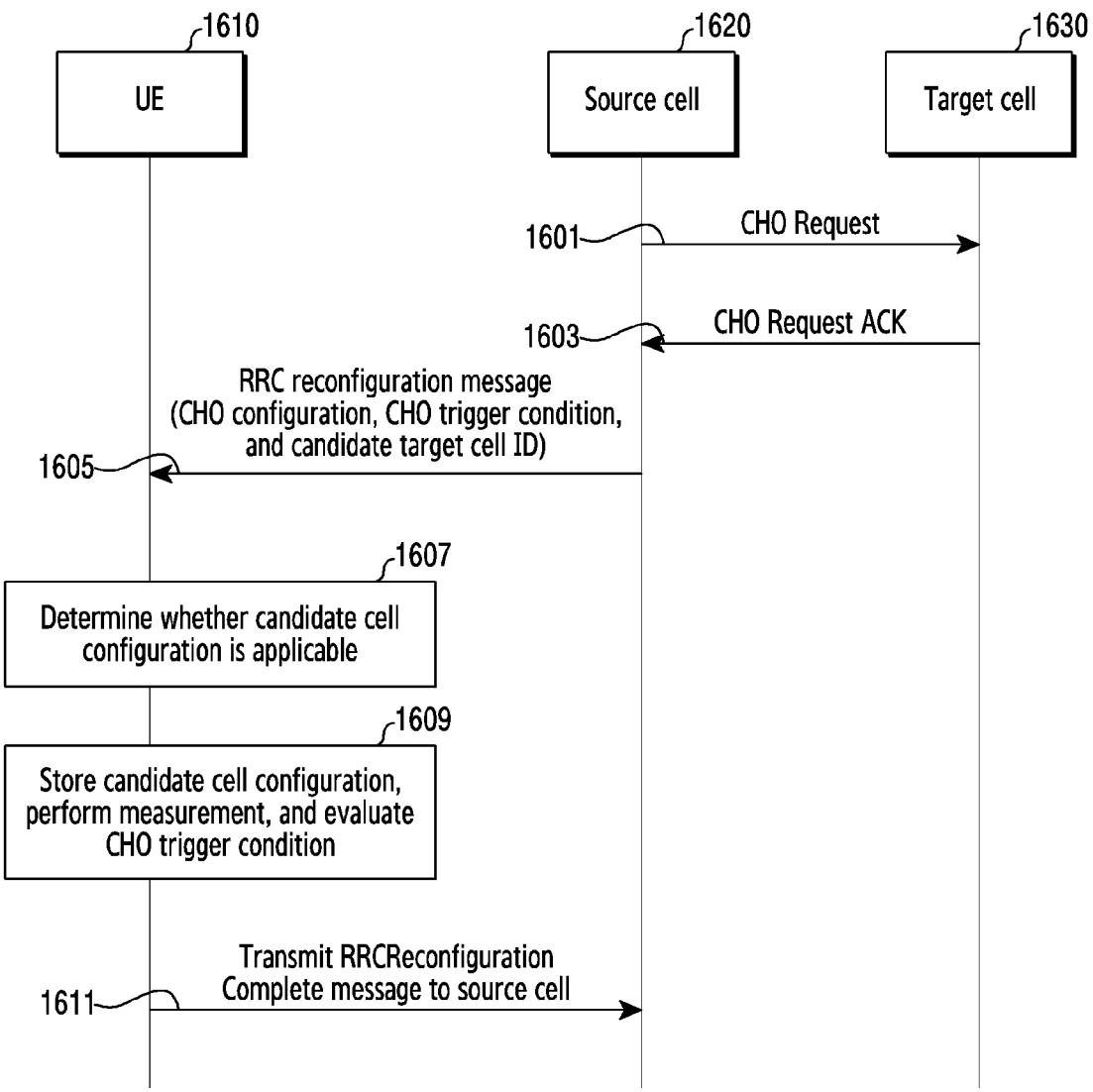
FIG. 16 illustrates an example of a case of, if an applicability check for a CHO candidate cell configuration is successful, transmitting an RRC reconfiguration completion message to a source cell in the wireless communication system according to various embodiments.

FIG. 16 illustrates an example of a case of, if an applicability check for a CHO candidate cell configuration is successful, transmitting an RRC reconfiguration completion message to a source cell in the wireless communication system according to various embodiments. In FIG. 16, a UE 1610 may be the terminal 120, and operations of a source cell 1620 and a target cell 1630 may be performed by the elements of the base station 110.

Referring to FIG. 16, in operation 1601, the source cell 1620 may transmit a CHO request to the target cell 1630. The source cell 1620 may request a CHO from the target cell 1630 via a CHO request.

In operation 1603, the target cell 1630 may transmit a CHO request ACK to the source cell 1620. The target cell 1630 may transmit, to the source cell 1620, the CHO request ACK message to accept the CHO request.

In operation 1605, the source cell 1620 may transmit an RRC reconfiguration message to the UE 1610. The RRC reconfiguration message may include a candidate cell configuration for a candidate cell (e.g., the target cell 1630), and the candidate cell configuration may include a CHO configuration, a CHO trigger condition, and a candidate target cell ID for the candidate cell (e.g., the target cell 1630).

In operation 1607, the UE 1610 may determine whether the received candidate cell configuration is applicable. In other words, the UE 1610 may perform an applicability check for the received candidate cell configuration. In FIG. 16, it is assumed that the applicability check is successful.

In operation 1609, the UE 1610 may store the candidate cell configuration and may perform measurement to determine whether the CHO trigger condition is satisfied.

In operation 1611, the UE 1610 may transmit an RRCReconfigurationComplete message to the source cell 1620, independently of operation 1609, in response to the success of the applicability check. After applying the candidate cell configuration received from the source cell 1620, the UE 1610 may transmit the RRCReconfigurationComplete message to the source cell 1620.

Figure 17:
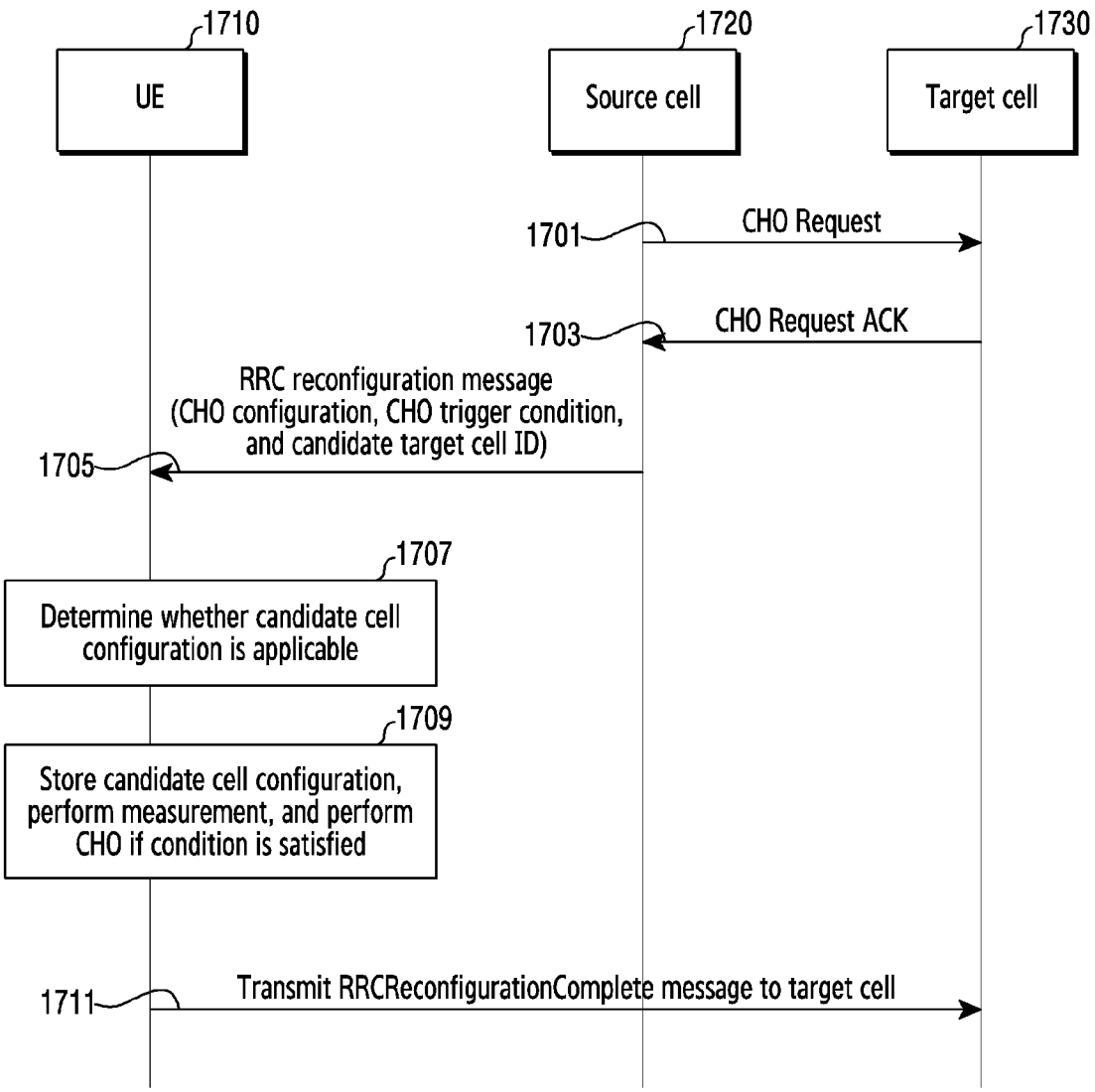
FIG. 17 illustrates an example of a case of, if an applicability check for a CHO candidate cell configuration is successful, transmitting an RRC reconfiguration completion message to a target cell in the wireless communication system according to various embodiments.

FIG. 17 illustrates an example of a case of, if an applicability check for a CHO candidate cell configuration is successful, transmitting an RRC reconfiguration completion message to a target cell in the wireless communication system according to various embodiments. In FIG. 17, a UE 1710 may be the terminal 120, and operations of a source cell 1720 and a target cell 1730 may be performed by the elements of the base station 110.

Referring to FIG. 17, in operation 1701, the source cell 1720 may transmit a CHO request to the target cell 1730. The source cell 1720 may request a CHO from the target cell 1730 via a CHO request.

In operation 1703, the target cell 1730 may transmit a CHO request ACK to the source cell 1720. The target cell 1730 may transmit the CHO request ACK message for accepting of the CHO request to the source cell 1720.

In operation 1705, the source cell 1720 may transmit an RRC reconfiguration message to the UE 1710. The RRC reconfiguration message may include a candidate cell configuration for a candidate cell (e.g., the target cell 1730), and the candidate cell configuration may include a CHO configuration, a CHO trigger condition, and a candidate target cell ID for the candidate cell (e.g., the target cell 1730).

In operation 1707, the UE 1710 may determine whether the received candidate cell configuration is applicable. In other words, the UE 1710 may perform an applicability check for the received candidate cell configuration. In FIG. 17, it is assumed that the applicability check is successful.

In operation 1709, the UE 1710 may store the candidate cell configuration and may perform measurement to determine whether the CHO trigger condition is satisfied. If the CHO trigger condition is satisfied at a specific time point, the UE 1710 may perform a CHO to a candidate cell (e.g., the target cell 1730) related to the CHO trigger condition.

In operation 1711, the UE 1710 may transmit an RRCReconfigurationComplete message to the target cell 1730. If the CHO is successful, the UE 1710 may transmit a random access preamble, may receive an RAR, and may transmit the RRCReconfigurationComplete message to the target cell 1730 via message3 or message5.

Figure 18:
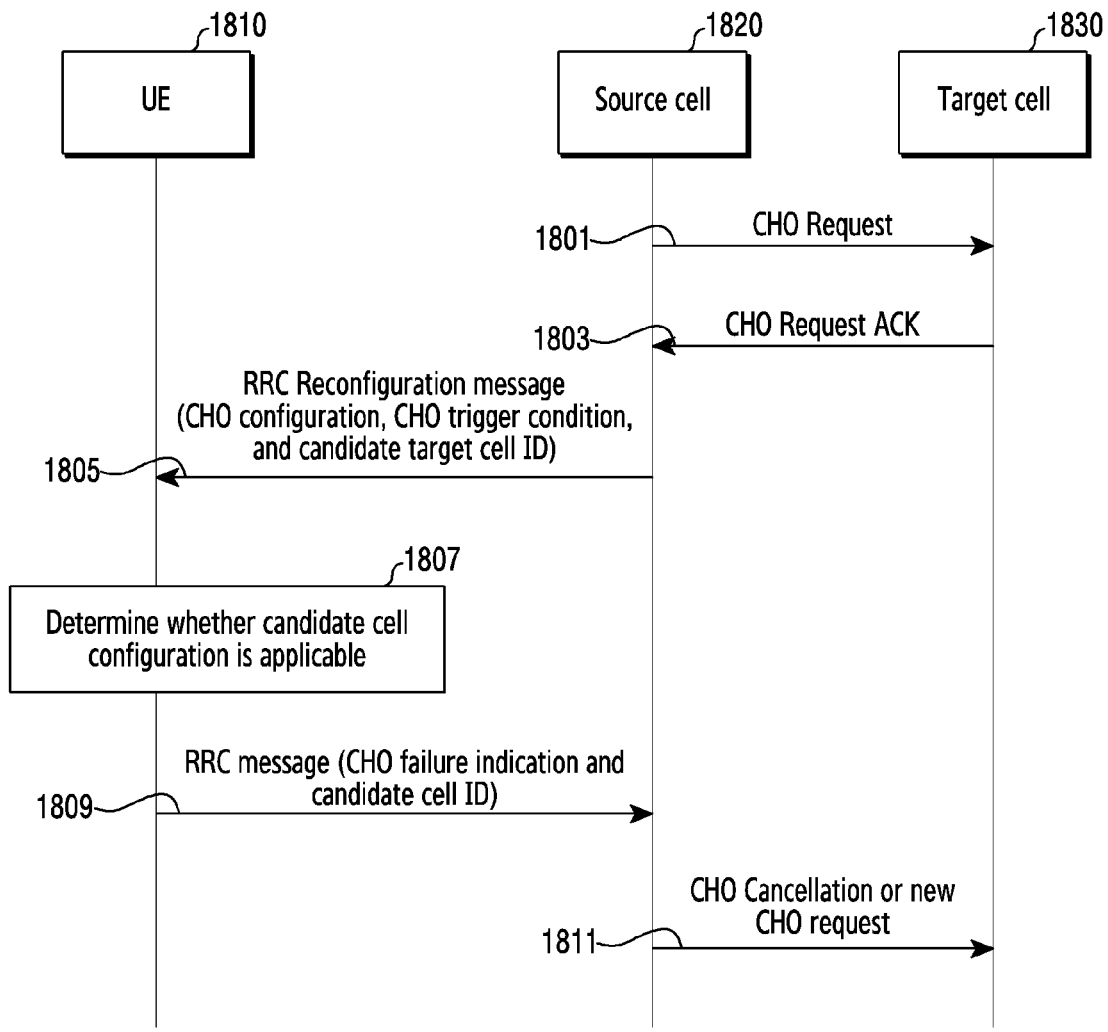
FIG. 18 illustrates an example of a case of, if an applicability check for a CHO candidate cell configuration has failed, transmitting a failure message in the wireless communication system according to various embodiments.

FIG. 18 illustrates an example of a case of, if an applicability check for a CHO candidate cell configuration has failed, transmitting a failure message in the wireless communication system according to various embodiments. In FIG. 18, a UE 1810 may be the terminal 120, and operations of a source cell 1820 and a target cell 1830 may be performed by the elements of the base station 110.

Referring to FIG. 18, in operation 1801, the source cell 1820 may transmit a CHO request to the target cell 1830. The source cell 1820 may request a CHO from the target cell 1830 via a CHO request.

In operation 1803, the target cell 1830 may transmit a CHO request ACK to the source cell 1820. The target cell 1830 may transmit the CHO request ACK message for accepting of the CHO request to the source cell 1820.

In operation 1805, the source cell 1820 may transmit an RRC reconfiguration message to the UE 1810. The RRC reconfiguration message may include a candidate cell configuration for a candidate cell (e.g., the target cell 1830), and the candidate cell configuration may include a CHO configuration, a CHO trigger condition, and a candidate target cell ID for the candidate cell (e.g., the target cell 1830).

In operation 1807, the UE 1810 may determine whether the received candidate cell configuration is applicable. In other words, the UE 1810 may perform an applicability check for the received candidate cell configuration. In FIG. 18, it is assumed that the applicability check has failed.

In operation 1809, the UE 1810 may transmit an RRC message including a CHO failure indication and a candidate cell ID to the source cell 1820. In other words, the UE 1810 may transmit the RRC message to the source cell 1820, the RRC message including an indicator indicating that the applicability check for the CHO candidate cell configuration has failed, and the candidate cell ID related to the CHO candidate cell configuration.

In operation 1811, the source cell 1820 may transmit a CHO cancellation message or a new CHO request message to the target cell 1830. The source cell 1820 may transmit the new CHO request message to the target cell 1830 that is a cell having the candidate cell ID related the CHO candidate cell configuration, for which the applicability check has failed, or may transmit the CHO cancellation message.

Figure 19:
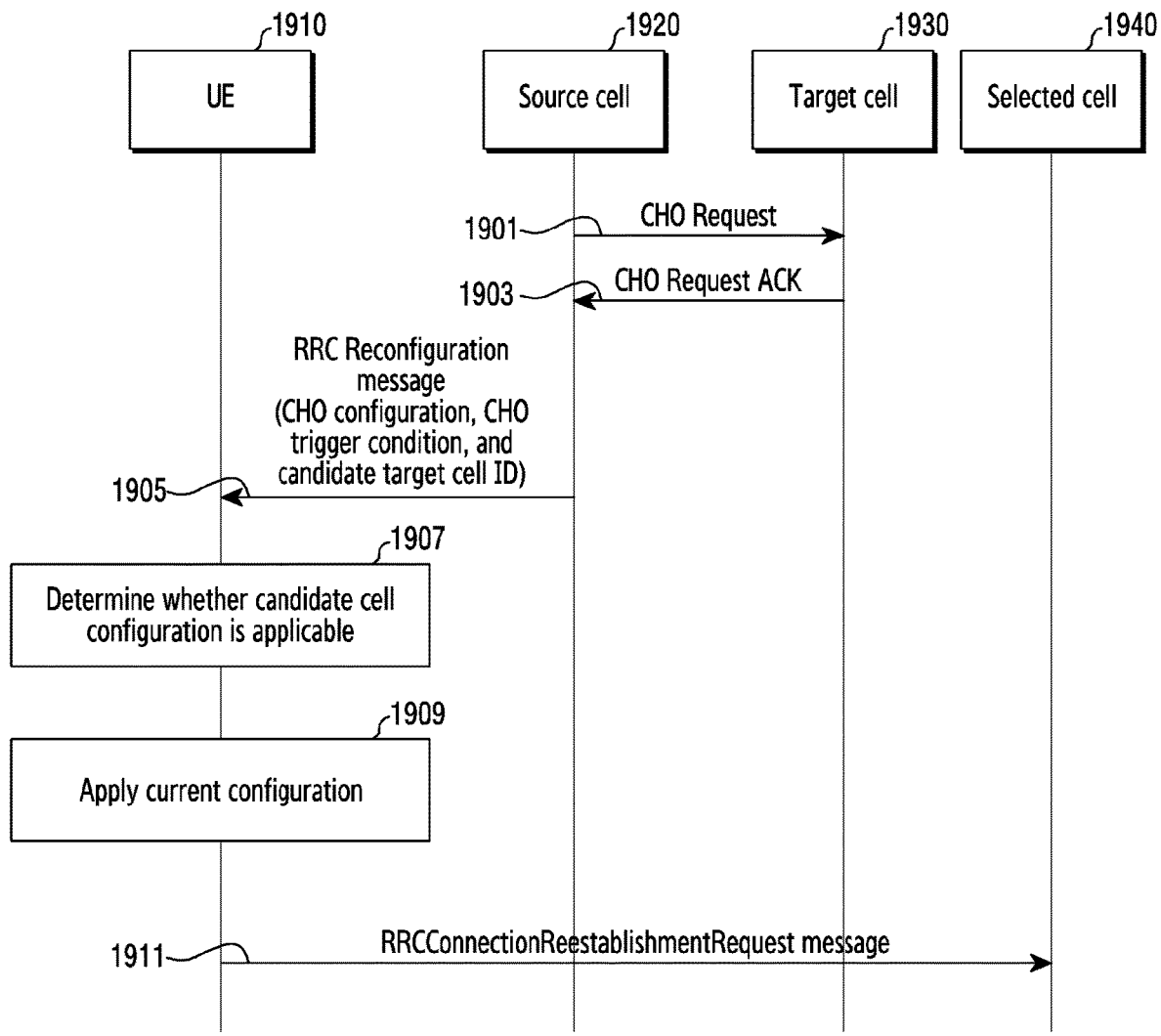
FIG. 19 illustrates an example of a case of, if an applicability check for a CHO candidate cell configuration has failed, performing an RRC connection re-establishment procedure in the wireless communication system according to various embodiments.

FIG. 19 illustrates an example of a case of, if an applicability check for a CHO candidate cell configuration has failed, performing an RRC connection re-establishment procedure in the wireless communication system according to various embodiments. In FIG. 19, a UE 1910 may be the terminal 120, and operations of a source cell 1920 and a target cell 1930 may be performed by the elements of the base station 110.

Referring to FIG. 19, in operation 1901, the source cell 1920 may transmit a CHO request to the target cell 1930. The source cell 1920 may request a CHO from the target cell 1930 via a CHO request.

In operation 1903, the target cell 1930 may transmit a CHO request ACK to the source cell 1920. The target cell 1930 may transmit the CHO request ACK message for accepting of the CHO request to the source cell 1920.

In operation 1905, the source cell 1920 may transmit an RRC reconfiguration message to the UE 1910. The RRC reconfiguration message may include a candidate cell configuration for a candidate cell (e.g., the target cell 1930), and the candidate cell configuration may include a CHO configuration, a CHO trigger condition, and a candidate target cell ID for the candidate cell (e.g., the target cell 1930).

In operation 1907, the UE 1910 may determine whether the received candidate cell configuration is applicable. In other words, the UE 1910 may perform an applicability check for the received candidate cell configuration. In FIG. 19, it is assumed that the applicability check has failed.

In operation 1909, the UE 1910 may apply a current configuration. In other words, the UE 1910 may apply an RRC configuration that is currently being used by the UE 1910, without applying the received RRC reconfiguration (e.g., the candidate cell configuration for the target cell 1930).

In operation 1911, the UE 1910 may perform a RRCConnectionRe-establishment procedure. For the RRCConnectionRe-establishment procedure, the UE 1910 may transmit an RRCConnectionRe-establishment request message to a selected cell 1940. For example, when AS security is enabled, the UE 1910 may transmit, for the RRCConnectionRe-establishment procedure, the RRCConnectionRe-establishment request message to the selected cell 1940 via a cell selection procedure.

In various embodiments, when the AS security is not enabled, the UE 1910 may transition to an RRC IDLE state. In this case, operation 1911 may be omitted.

Figure 20:
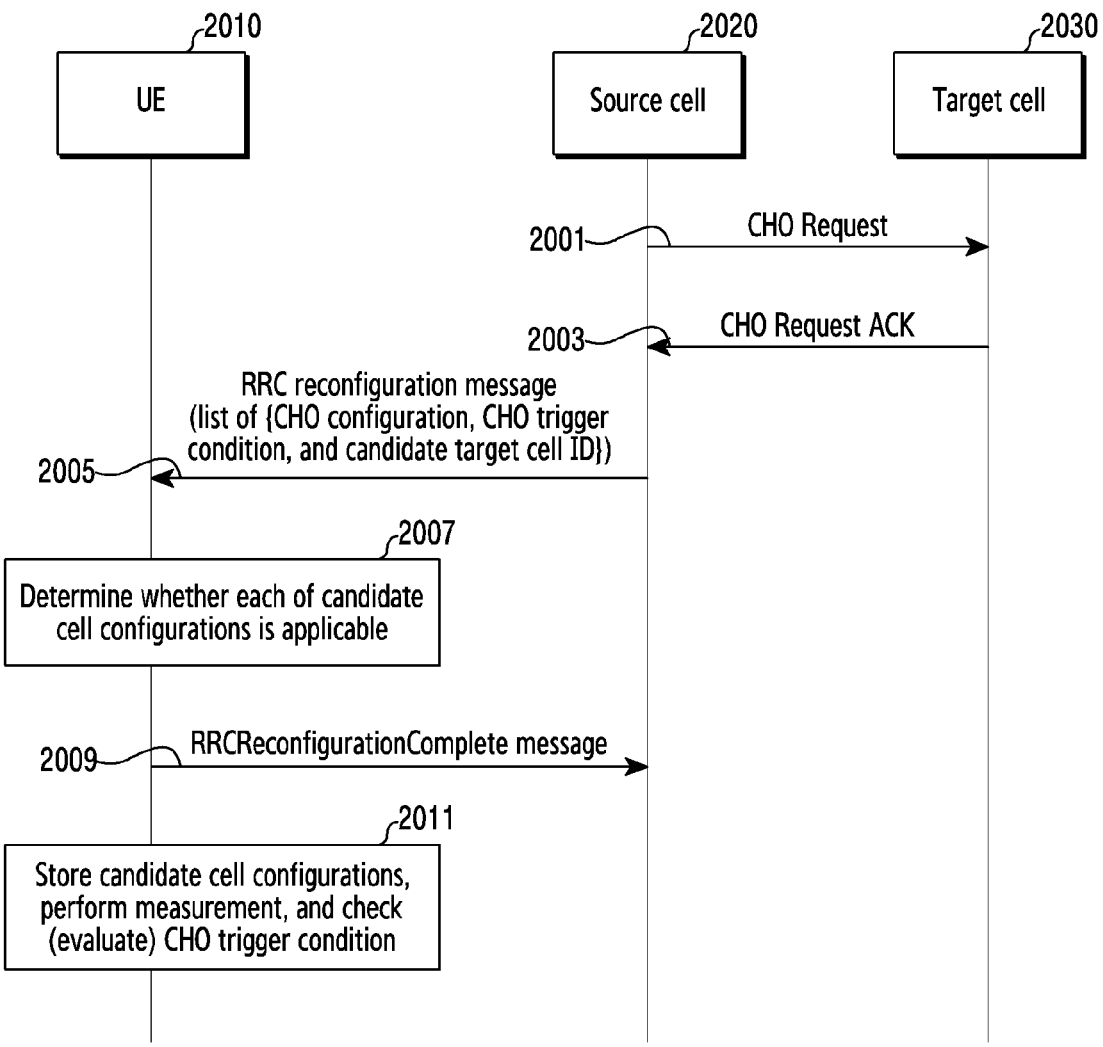
FIG. 20 illustrates an example of a case of, if an applicability check for a plurality of CHO candidate cell configurations is successful, transmitting an RRC reconfiguration completion message in the wireless communication system according to various embodiments.

FIG. 20 illustrates an example of a case of, if an applicability check for a plurality of CHO candidate cell configurations is successful, transmitting an RRC reconfiguration completion message in the wireless communication system according to various embodiments. In FIG. 20, a UE 2010 may be the terminal 120, and operations of a source cell 2020 and a target cell 2030 may be performed by the elements of the base station 110.

Referring to FIG. 20, in operation 2001, the source cell 2020 may transmit a CHO request to the target cell 2030. The source cell 2020 may request a CHO from the target cell 2030 via a CHO request.

In operation 2003, the target cell 2030 may transmit a CHO request ACK to the source cell 2020. The target cell 2030 may transmit the CHO request ACK message for accepting of the CHO request to the source cell 2020.

In operation 2005, the source cell 2020 may transmit an RRC reconfiguration message to the UE 2010. The RRC reconfiguration message may include a list of candidate cell configurations for a plurality of candidate cells, which includes a candidate cell configuration for a candidate cell (e.g., the target cell 2030), and each candidate cell configuration may include a candidate cell ID, a CHO configuration, and a CHO trigger condition for each candidate cell.

In operation 2007, the UE 2010 may determine whether each candidate cell configuration in the received list is applicable. In other words, the UE 2010 may perform an applicability check for each candidate cell configuration. In FIG. 20, it is assumed that the applicability check for all candidate cell configurations of the received list is successful.

In operation 2009, the UE 2010 may transmit an RRCReconfigurationComplete message to the source cell 2020. In response to determining that the applicability check for all candidate cell configurations has been successful, the UE 2010 may transmit the RRCReconfigurationComplete message to the source cell 2020.

In operation 2011, the UE 2010 may store candidate cell configurations, may perform measurement, and may evaluate CHO trigger conditions. The UE 2010 may store candidate cell configurations, for which the applicability check has been successful, may perform measurement for each candidate cell on the basis of the CHO configuration for each candidate cell, and may determine whether the CHO trigger condition for each candidate cell is satisfied, on the basis of a measurement result.

Figure 21:
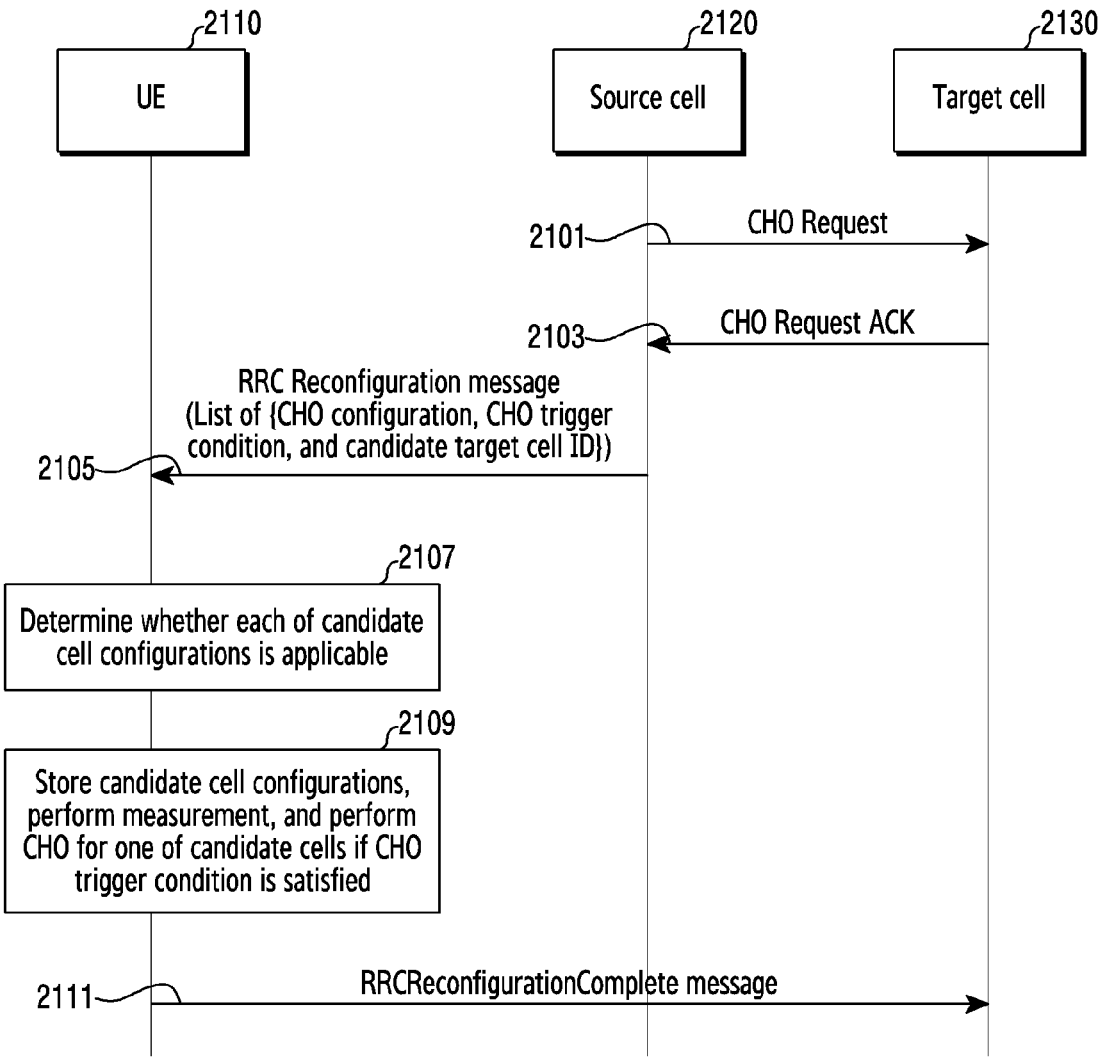
FIG. 21 illustrates an example of a case of, if an applicability check for a plurality of CHO candidate cell configurations is successful, performing a CHO and then transmitting an RRC reconfiguration completion message in the wireless communication system according to various embodiments.

FIG. 21 illustrates an example of a case of, if an applicability check for a plurality of CHO candidate cell configurations is successful, performing a CHO and then transmitting an RRC reconfiguration completion message in the wireless communication system according to various embodiments. In FIG. 21, a UE 2110 may be the terminal 120, and operations of a source cell 2120 and a target cell 2130 may be performed by the elements of the base station 110.

Referring to FIG. 21, in operation 2101, the source cell 2120 may transmit a CHO request to the target cell 2130. The source cell 2120 may request a CHO from the target cell 2130 via a CHO request.

In operation 2103, the target cell 2130 may transmit a CHO request ACK to the source cell 2120. The target cell 2130 may transmit the CHO request ACK message for accepting of the CHO request to the source cell 2120.

In operation 2105, the source cell 2120 may transmit an RRC reconfiguration message to the UE 2110. The RRC reconfiguration message may include a list of candidate cell configurations for a plurality of candidate cells, which includes a candidate cell configuration for a candidate cell (e.g., the target cell 2130), and each candidate cell configuration may include a candidate cell ID, a CHO configuration, and a CHO trigger condition for each candidate cell.

In operation 2107, the UE 2110 may determine whether each candidate cell configuration in the received list is applicable. In other words, the UE 2110 may perform an applicability check for each candidate cell configuration. In FIG. 21, it is assumed that the applicability check for all candidate cell configurations of the received list is successful.

In operation 2109, the UE 2110 may store candidate cell configurations, for which the applicability check has been successful, may perform measurement for each candidate cell, and may evaluate CHO trigger conditions. The UE 2110 may perform measurement for each candidate cell on the basis of the CHO configuration for each candidate cell, and may determine whether the CHO trigger condition for each candidate cell is satisfied, on the basis of a measurement result. If one or more CHO trigger conditions are satisfied at a specific time point, the UE 2110 may select a target cell from among candidate cells, for which the CHO trigger condition is satisfied, and may perform a CHO to the selected target cell.

In operation 2111, the UE 2110 may transmit an RRCReconfigurationComplete message to the target cell 2130. If the CHO is successful, the UE 2110 may transmit a random access preamble, may receive an RAR, and may transmit the RRCReconfigurationComplete message to the target cell 2130 via message3 or message5.

Figure 22:
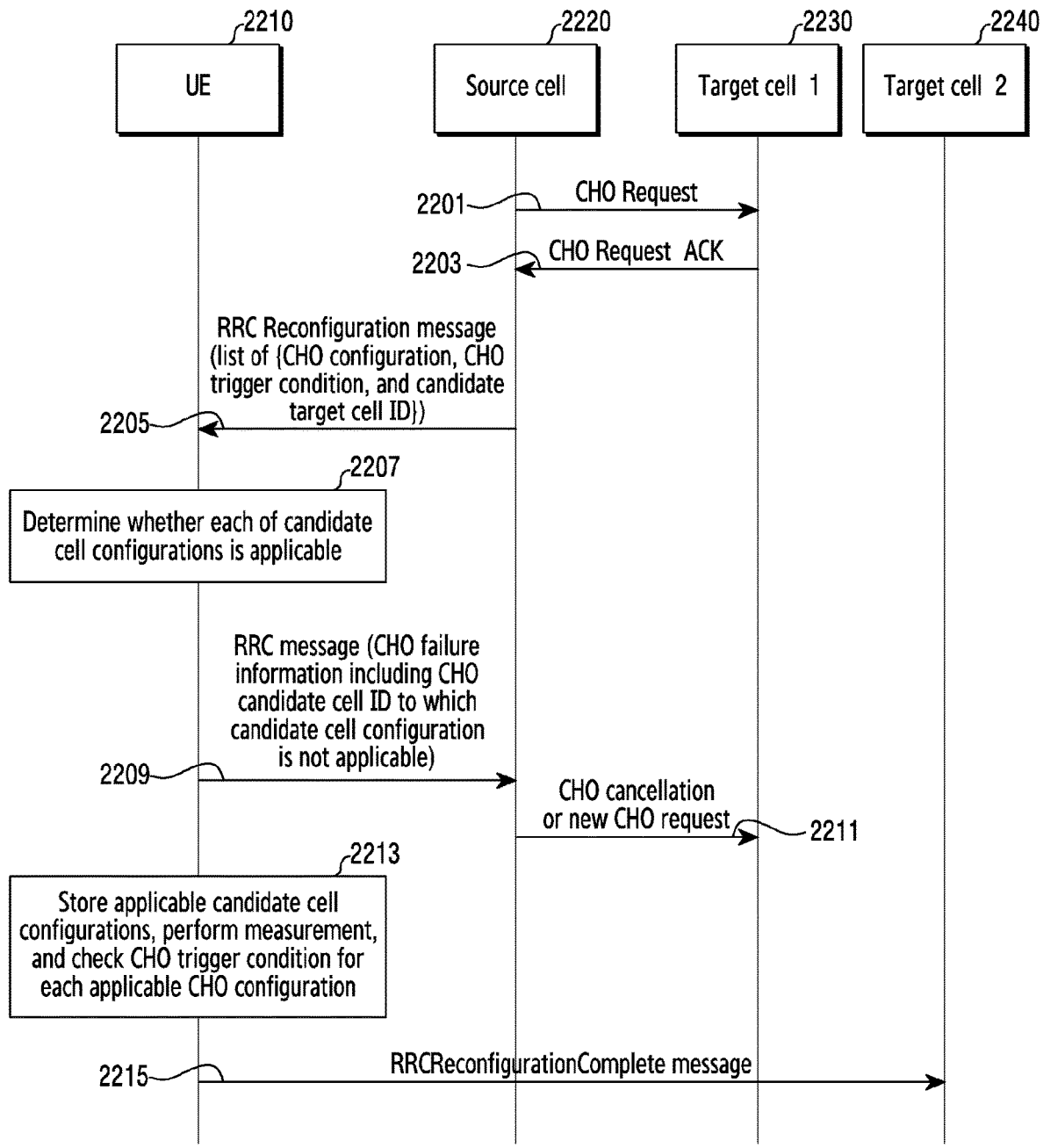
FIG. 22 illustrates an example of a case of, if an applicability check for some candidate cell configurations among a plurality of CHO candidate cell configurations has failed, transmitting a failure message in the wireless communication system according to various embodiments.

FIG. 22 illustrates an example of a case of, if an applicability check for some candidate cell configurations among a plurality of CHO candidate cell configurations has failed, transmitting a failure message in the wireless communication system according to various embodiments. In FIG. 22, a UE 2210 may be the terminal 120, and operations of a source cell 2220, target cell 1 2230, and target cell 2 2240 may be performed by the elements of the base station 110.

Referring to FIG. 22, in operation 2201, the source cell 2220 may transmit a CHO request to the target cell 2230. The source cell 2220 may request a CHO from the target cell 2230 via a CHO request.

In operation 2203, the target cell 2230 may transmit a CHO request ACK to the source cell 2220. The target cell 2230 may transmit, to the source cell 2220, the CHO request ACK message to accept the CHO request.

In operation 2205, the source cell 2220 may transmit an RRC reconfiguration message to the UE 2210. The RRC reconfiguration message may include a list of candidate cell configurations for a plurality of candidate cells, which includes a candidate cell configuration for a candidate cell (e.g., the target cell 2230), and each candidate cell configuration may include a candidate cell ID, a CHO configuration, and a CHO trigger condition for each candidate cell.

In operation 2207, the UE 2210 may determine whether each candidate cell configuration in the received list is applicable. In other words, the UE 2210 may perform an applicability check for each candidate cell configuration. In FIG. 22, it is assumed that the applicability check for some of the candidate cell configurations of the received list fails. For example, it is assumed that the candidate cell configuration for target cell 1 2230 is not applicable, and the candidate cell configuration for target cell 2 2240 is applicable.

In operation 2209, the UE 2210 may transmit an RRC message to the source cell 2220. The RRC message may include CHO failure information, and the CHO failure information may include a candidate cell ID (e.g., the candidate cell ID of target cell 1 2230) of a candidate cell, for which the candidate cell configuration is not applicable. As another embodiment, the RRC message may further include a candidate cell ID of a candidate cell (e.g., target cell 2 2240), for which the applicability check has been successful.

In operation 2211, the source cell 2220 may transmit a CHO cancellation message or a new CHO request message to target cell 1 2230. The source cell 2220 may transmit the new CHO request message to target cell 1 2230, for which the applicability check has failed, or may transmit the CHO cancellation message.

In operation 2213, the UE 2210 may store applicable candidate cell configurations, may perform measurement, and may evaluate CHO trigger conditions. For example, the UE 2210 may perform measurement for each candidate cell on the basis of the CHO configuration for each candidate cell (e.g., target cell 2 2240) for which an applicability check has been successful, and may determine whether the CHO trigger condition for each candidate cell is satisfied, on the basis of a measurement result. If one or more CHO trigger conditions are satisfied at a specific time point, the UE 2210 may select a target cell (e.g., target cell 2 2240) from among candidate cells, for which the CHO trigger condition is satisfied, and may perform a CHO to selected target cell 2 2240.

In operation 2215, the UE 2210 may transmit an RRCReconfigurationComplete message to the target cell 2230. If the CHO is successful, the UE 2210 may transmit a random access preamble, may receive an RAR, and may transmit the RRCReconfigurationComplete message to target cell 2 2240 via message3 or message5.

Figure 23:
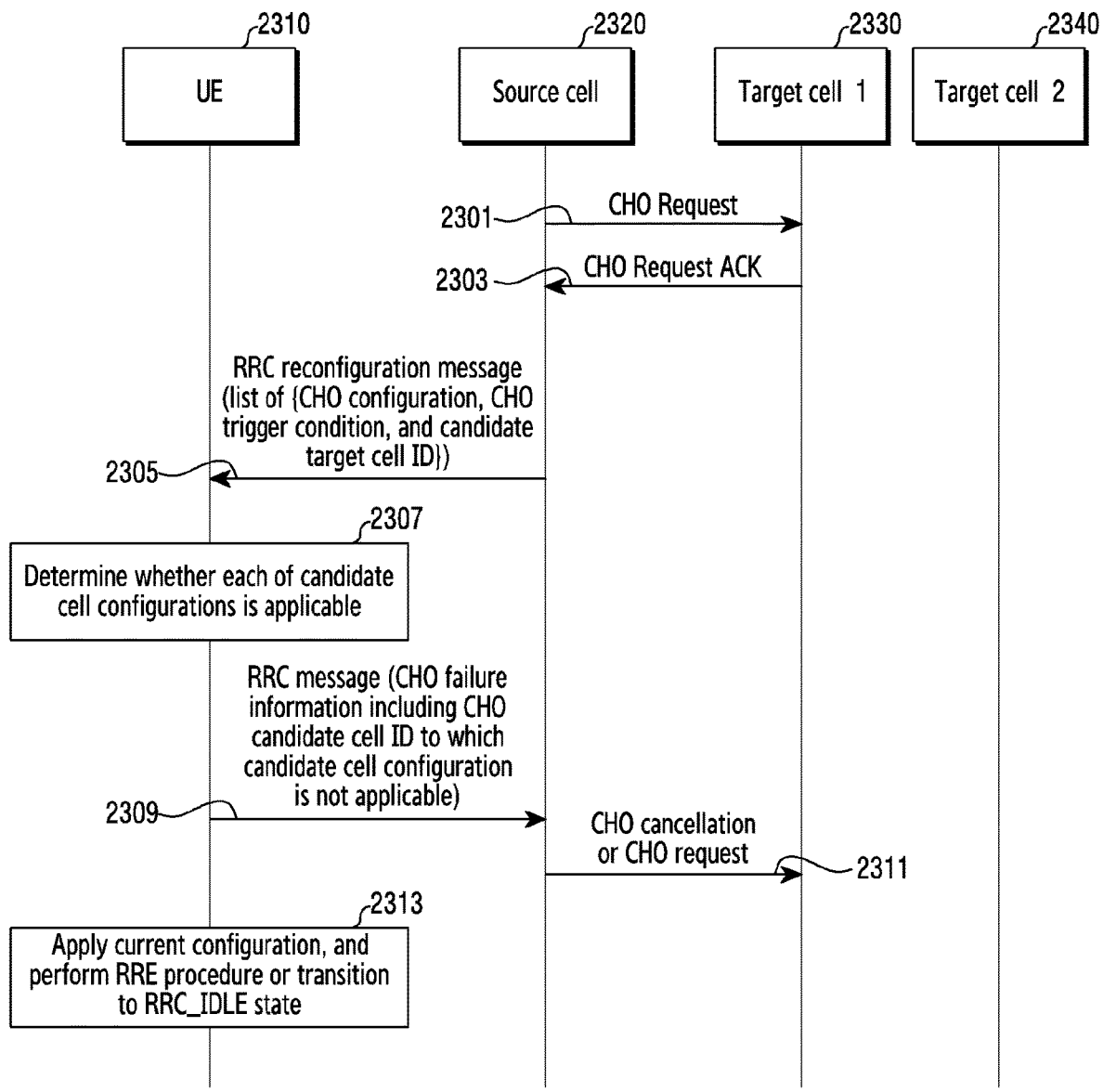
FIG. 23 illustrates an example of a case of, if an applicability check for some candidate cell configurations among a plurality of CHO candidate cell configurations has failed, performing RRE in the wireless communication system according to various embodiments.

FIG. 23 illustrates an example of a case of, if an applicability check for some candidate cell configurations among a plurality of CHO candidate cell configurations has failed, performing RRE in the wireless communication system according to various embodiments. In FIG. 23, a UE 2310 may be the terminal 120, and operations of a source cell 2320, target cell 1 2330, and target cell 2 2340 may be performed by the elements of the base station 110.

Referring to FIG. 23, in operation 2301, the source cell 2320 may transmit a CHO request to the target cell 2330. The source cell 2320 may request a CHO from the target cell 2330 via a CHO request.

In operation 2303, the target cell 2330 may transmit a CHO request ACK to the source cell 2320. The target cell 2330 may transmit, to the source cell 2320, the CHO request ACK message to accept the CHO request.

In operation 2305, the source cell 2320 may transmit an RRC reconfiguration message to the UE 2310. The RRC reconfiguration message may include a list of candidate cell configurations for a plurality of candidate cells, which includes a candidate cell configuration for a candidate cell (e.g., the target cell 2330), and each candidate cell configuration may include a candidate cell ID, a CHO configuration, and a CHO trigger condition for each candidate cell.

In operation 2307, the UE 2310 may determine whether each candidate cell configuration in the received list is applicable. In other words, the UE 2310 may perform an applicability check for each candidate cell configuration. In FIG. 23, it is assumed that the applicability check for some of the candidate cell configurations of the received list fails. For example, it is assumed that the candidate cell configuration for target cell 1 2330 is not applicable, and the candidate cell configuration for target cell 2 2340 is applicable.

In operation 2309, the UE 2310 may transmit, to the source cell 2320, an RRC message including CHO failure information that includes a candidate cell ID of a candidate cell (e.g., target cell 1 2230) to which the candidate cell configuration is not applicable. As another embodiment, the RRC message may further include a candidate cell ID of a candidate cell (e.g., target cell 2 2340), for which the applicability check has been successful.

In operation 2311, the source cell 2320 may transmit a CHO cancellation message or a new CHO request message to target cell 1 2330. The source cell 2320 may transmit the new CHO request message to target cell 1 2330, for which the applicability check has failed, or may transmit the CHO cancellation message.

In operation 2313, the UE 2310 may apply a current RRC configuration and may perform an RRE procedure, or may transition to the RRC IDLE state. In other words, the UE 2310 may not apply the candidate cell configuration for a candidate cell (e.g., target cell 1 2330), for which the applicability check has failed, and may apply the RRC configuration currently being used by the UE 2310. If AS security is enabled, the UE 2310 may perform RRE. If the AS security is not enabled, the UE 2310 may transition to the RRC IDLE state.

Figure 24:
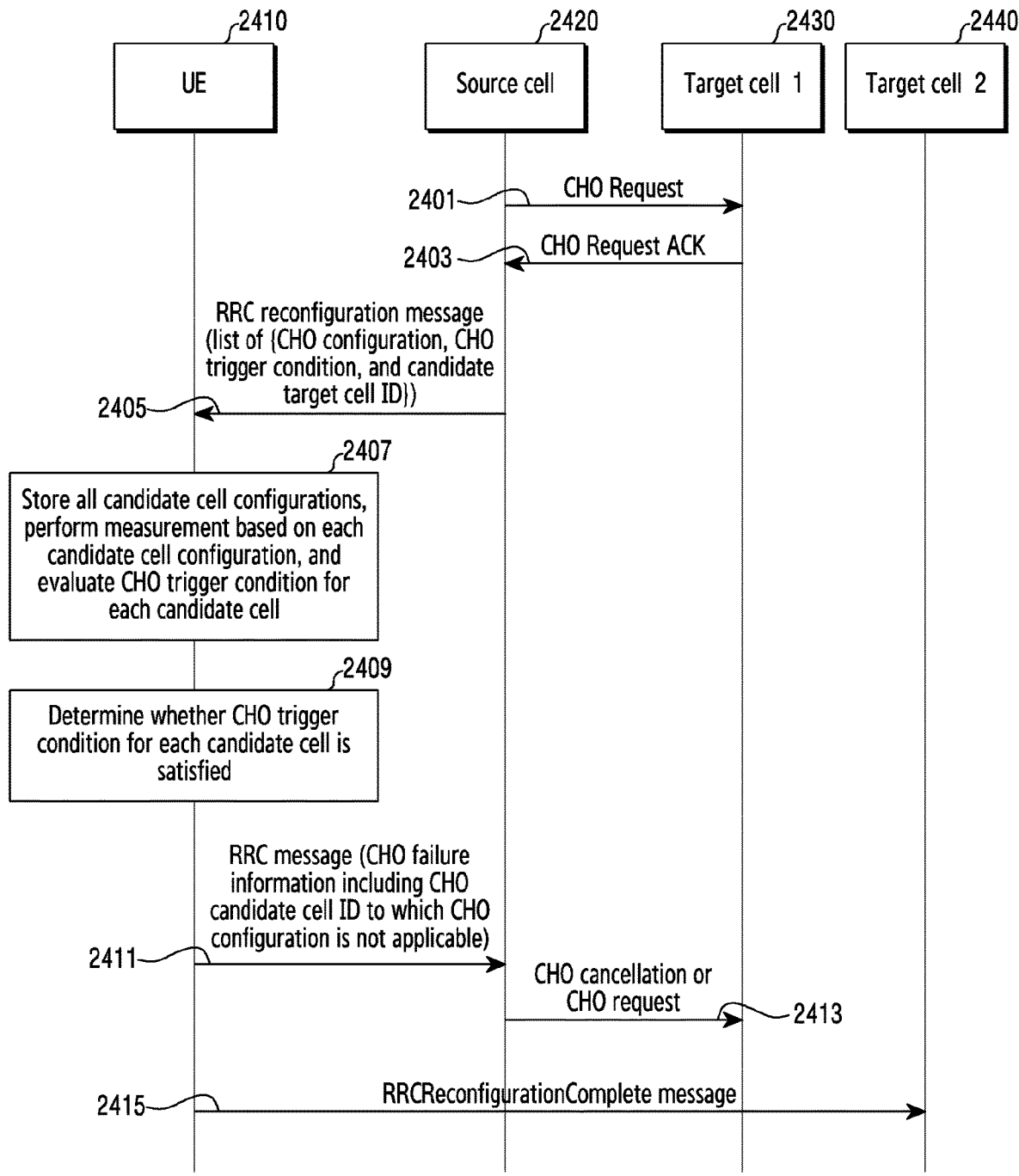
FIG. 24 illustrates an example of a case of performing an applicability check for a candidate cell configuration for a candidate cell that satisfies a CHO trigger condition in the wireless communication system according to various embodiments.

FIG. 24 illustrates an example of a case of performing an applicability check for a candidate cell configuration for a candidate cell that satisfies a CHO trigger condition in the wireless communication system according to various embodiments. In FIG. 24, a UE 2410 may be the terminal 120, and operations of a source cell 2420, target cell 1 2430, and target cell 2 2440 may be performed by the elements of the base station 110.

Referring to FIG. 24, in operation 2401, the source cell 2420 may transmit a CHO request to the target cell 2430. The source cell 2420 may request a CHO from the target cell 2430 via a CHO request.

In operation 2403, the target cell 2430 may transmit a CHO request ACK to the source cell 2420. The target cell 2430 may transmit, to the source cell 2420, the CHO request ACK message to accept the CHO request.

In operation 2405, the source cell 2420 may transmit an RRC reconfiguration message to the UE 2410. The RRC reconfiguration message may include a list of candidate cell configurations for a plurality of candidate cells, which includes a candidate cell configuration for a candidate cell (e.g., the target cell 2430), and each candidate cell configuration may include a candidate cell ID, a CHO configuration, and a CHO trigger condition for each candidate cell.

In operation 2407, the UE 2410 may store all candidate cell configurations, may perform measurement based on each candidate cell configuration, and may evaluate a CHO trigger condition for each candidate cell. In other words, the UE 2410 may store all candidate cell configurations of the received list, and may perform measurement based on each candidate cell configuration.

In operation 2409, the UE 2410 may determine whether the CHO trigger condition for each candidate cell is satisfied. If one or more CHO trigger conditions are satisfied at a specific time point, the UE 2410 may select a target cell from among candidate cells, for which the CHO trigger condition is satisfied, and may perform an applicability check on the candidate cell configuration for the selected target cell. If the applicability check fails, operations 2411 and 2413 may be performed. In this case, operation 2415 may be omitted. On the other hand, if the applicability check succeeds, operation 2415 may be performed, and operations 2411 and 2413 may be omitted.

In operation 2411, the UE 2410 may transmit an RRC message to the source cell 2420. The RRC message may include CHO failure information, and the CHO failure information may include a candidate cell ID of a candidate cell (e.g., target cell 1 2430), for which the candidate cell configuration is not applicable. The UE 2410 may transmit the RRC message in a state of applying a current RRC configuration.

In operation 2413, the source cell 2420 may transmit a CHO cancellation message or a new CHO request message to target cell 1 2430. The source cell 2420 may transmit the new CHO request message to target cell 1 2430, for which the applicability check has failed, or may transmit the CHO cancellation message.

As another example, in a case where the applicability check fails, if AS security is enabled, the UE 2410 may perform RRCConnectionRe-establishment (RRE), and if the AS security is not enabled, the UE 2410 may transition to the RRC IDLE state.

In operation 2415, the UE 2410 may transmit an RRCReconfigurationComplete message to target cell 2 2440. For example, the UE 2410 may perform a CHO to target cell 2 2440 on the basis of the candidate cell configuration for target cell 2 2240, for which the applicability check has been successful, and may transmit the RRCReconfigurationComplete message to target cell 2 2440.

Figure 25:
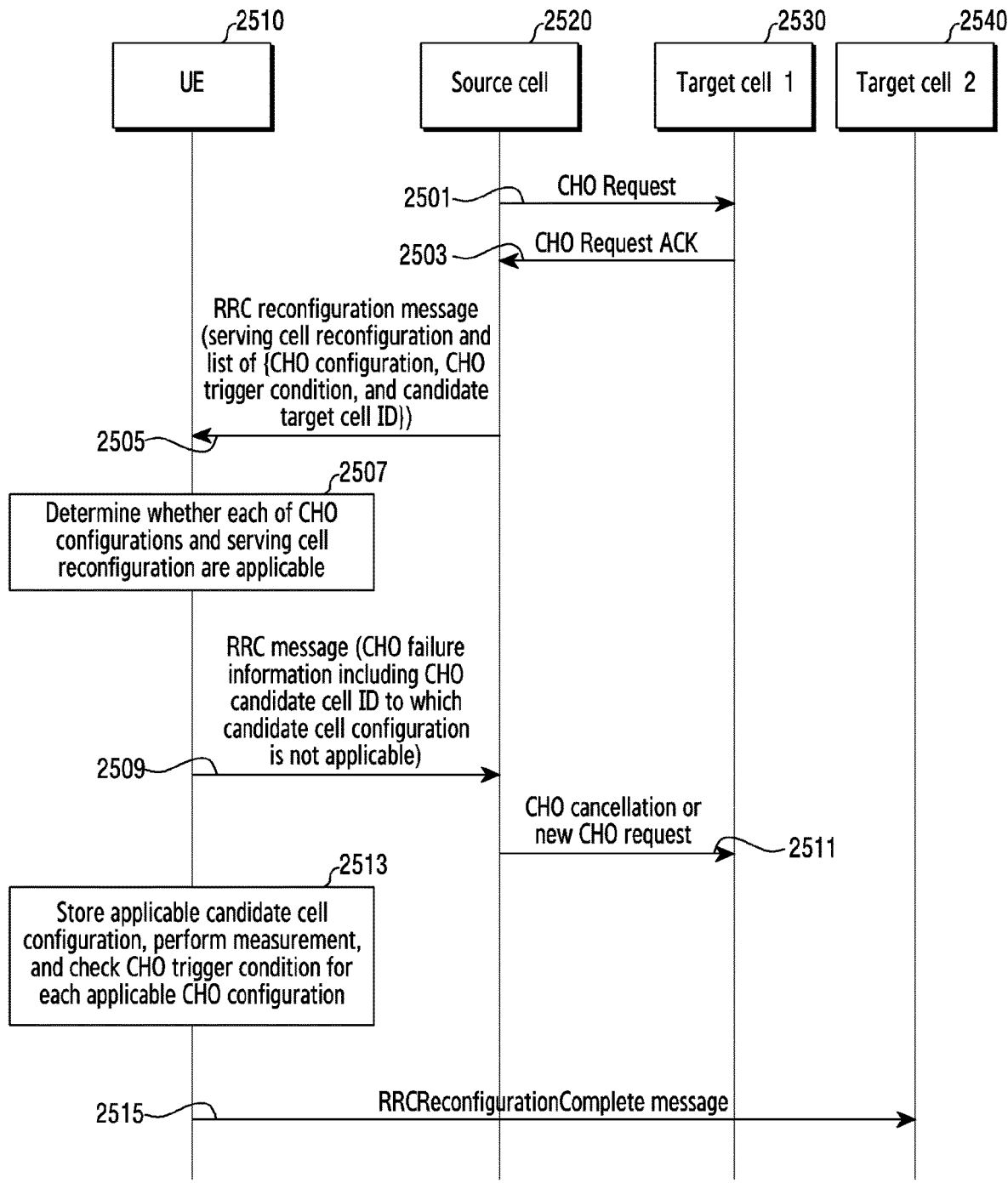
FIG. 25 illustrates an example of a case of receiving CHO candidate cell configurations for a plurality of candidate cells together with a reconfiguration related to a current serving cell in the wireless communication system according to various embodiments.

FIG. 25 illustrates an example of a case of receiving CHO candidate cell configurations for a plurality of candidate cells together with a reconfiguration related to a current serving cell in the wireless communication system according to various embodiments. In FIG. 25, a UE 2510 may be the terminal 120, and operations of a source cell 2520, target cell 1 2530, and target cell 2 2540 may be performed by the elements of the base station 110.

Referring to FIG. 25, in operation 2501, the source cell 2520 may transmit a CHO request to target cell 1 2530. The source cell 2520 may request a CHO from target cell 1 2530 via a CHO request.

In operation 2503, target cell 1 2530 may transmit a CHO request ACK to the source cell 2520. Target cell 1 2530 may transmit, to the source cell 2520, the CHO request ACK message to accept the CHO request.

In operation 2505, the source cell 2520 may transmit an RRC reconfiguration message to the UE 2510. The RRC reconfiguration message may include reconfiguration information (hereinafter, it may be referred to as a serving cell reconfiguration) from a current serving cell (e.g., 2520) of the UE 2510, which is for reconfiguration of the configuration of the UE 2510, and a list of candidate cell configurations for a plurality of candidate cells, and each candidate cell configuration may include a candidate cell ID, a CHO configuration, and a CHO trigger condition for each candidate cell.

In operation 2507, the UE 2510 may determine whether each of the candidate cell configurations and the serving cell reconfiguration are applicable. In other words, the UE 2510 may perform an applicability check for each of the candidate cell configurations and the serving cell reconfiguration. In various embodiments, if the applicability check for the serving cell reconfiguration fails, regardless of whether the applicability check for the candidate cell configurations is successful, the UE 2510 may apply configuration information for the current serving cell, and the UE 2510 may i) perform RRE (if AS security is enabled), or ii) transition to the RRC IDLE state (if the AS security is not enabled). If the applicability check for the serving cell reconfiguration is successful, the UE 2510 may perform the applicability check for candidate cell configurations.

In operation 2509, the UE 2510 may transmit, to the source cell 2320, an RRC message including CHO failure information that includes a candidate cell ID of a candidate cell, to which the candidate cell configuration is not applicable. The UE 2510 may perform the applicability check for the candidate cell configurations, and if there is a candidate cell configuration, for which the applicability check has failed, the UE 2510 may transmit the RRC message, in which a reconfiguration failure type is indicated as a CHO configuration failure, to the source cell 2520, wherein the RRC message may include a candidate cell ID of a candidate cell, for which the applicability check has failed.

In operation 2511, the source cell 2520 may transmit a CHO cancellation message or a new CHO request message to target cell 1 2530. The source cell 2520 may transmit the new CHO request message to target cell 1 2530, for which the applicability check has failed, or may transmit the CHO cancellation message.

In operation 2513, the UE 2510 may store an applicable candidate cell configuration, may perform measurement based on the candidate cell configuration, and may evaluate a CHO trigger condition on the basis of a measurement result. The UE 2510 may store the candidate cell configuration, for which the applicability check has been successful, may perform measurement for each candidate cell on the basis of the CHO configuration for each candidate cell, and may determine whether a measurement result satisfies the CHO trigger condition for each candidate cell.

In operation 2515, the UE 2510 may transmit an RRCReconfigurationComplete message to target cell 2 2540. If one or more CHO trigger conditions are satisfied at a specific time point, the UE 2510 may select a target cell from among candidate cells, for which the CHO trigger condition is satisfied, and may perform a CHO to the selected target cell (e.g., target cell 2 2540). If the CHO is successful, the UE 2510 may transmit a random access preamble, may receive an RAR, and may transmit the RRCReconfigurationComplete message to target cell 2 2540 via message3 or message5.

Figure 26:
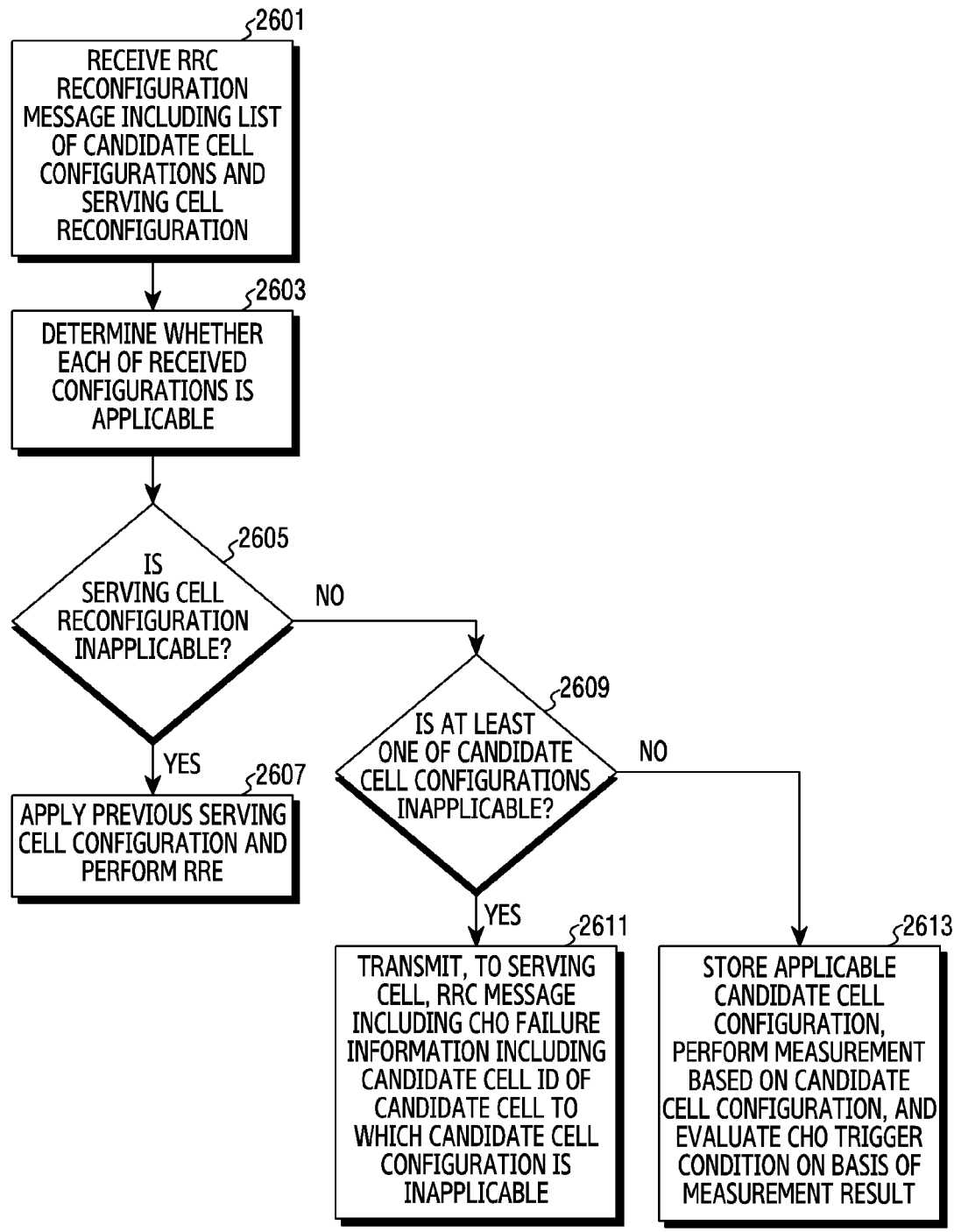
FIG. 26 illustrates a flowchart of a terminal in a case of receiving CHO candidate cell configurations for a plurality of candidate cells together with a reconfiguration related to a current serving cell in the wireless communication system according to various embodiments.

FIG. 26 illustrates a flowchart of a terminal in a case of receiving CHO candidate cell configurations for a plurality of candidate cells together with a reconfiguration related to a current serving cell in the wireless communication system according to various embodiments. FIG. 26 illustrates an operation method of the terminal 120.

Referring to FIG. 26, in operation 2601, the terminal may receive, from a source node, an RRC configuration message including a serving cell reconfiguration and a list of candidate cell configurations for multiple candidate cells. Each candidate cell configuration may include a candidate cell ID, a CHO configuration, and a CHO trigger condition for each candidate cell.

In operation 2603, the terminal may determine whether each of the received configurations is applicable. In other words, the terminal may perform an applicability check for each of the multiple candidate cell configurations and the serving cell reconfiguration.

In operation 2605, the terminal may determine whether the serving cell reconfiguration is applicable. The terminal may perform an applicability check for the serving cell reconfiguration, and if the serving cell reconfiguration is not applicable, the terminal may perform operation 2607. Alternatively, if the serving cell reconfiguration is applicable, operation 2609 may be performed.

In operation 2607, the terminal may apply a previous serving cell configuration and may perform RRE. If the applicability check for the serving cell reconfiguration fails, regardless of whether the applicability check for the candidate cell configurations is successful, the terminal may apply an existing serving cell configuration, and the terminal may i) perform RRE (if AS security is enabled), or ii) transition to the RRC IDLE state (if the AS security is not enabled).

In operation 2609, the terminal may determine whether at least one of the candidate cell configurations is not applicable. If the applicability check for the serving cell reconfiguration is successful, the terminal may perform an applicability check for each of the candidate cell configurations. The terminal may identify a candidate cell configuration, for which an applicability check has been successful, and a candidate cell configuration, for which an applicability check has failed, and the terminal may i) perform operation 2611 for the candidate cell configuration for which the applicability check has failed and, and ii) perform operation 2613 for the candidate cell configuration for which the applicability check has been successful.

In operation 2611, the terminal may transmit, to the source cell, the RRC message including CHO failure information that includes a candidate cell ID of a candidate cell, to which the candidate cell configuration is not applicable. The CHO failure information may include the candidate cell ID of the candidate cell for which the applicability check has failed. With respect to the candidate cell configuration for which the applicability check has been successful, the terminal may store the candidate cell configuration, may perform measurement based on the candidate cell configuration, and may evaluate a CHO trigger condition on the basis of a measurement result. The terminal may perform measurement for each candidate cell on the basis of a CHO configuration for each candidate cell, for which the applicability check has been successful, and may determine whether the CHO trigger condition for each candidate cell is satisfied, on the basis of a measurement result.

In operation 2613, the terminal may store an applicable candidate cell configuration, may perform measurement based on the candidate cell configuration, and may evaluate the CHO trigger condition on the basis of a measurement result. The terminal may perform measurement for each candidate cell on the basis of a CHO configuration for each candidate cell, for which the applicability check has been successful, and may determine whether the CHO trigger condition for each candidate cell is satisfied, on the basis of a measurement result. If one or more trigger conditions are satisfied at a specific time point, the terminal may select a target cell from among candidate cells, for which the CHO trigger condition is satisfied, and may perform a CHO to the selected target cell. If the CHO is successful, the terminal may transmit a random access preamble, may receive an RAR, and may transmit the RRCReconfigurationComplete message to target cell 2 2540 via message3 or message5.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station, a radio resource control (RRC) reconfiguration message including a first list of one or more conditional configuration information, wherein the first list of the one or more conditional configuration information includes:
   identification information for a candidate cell; and
   a conditional configuration for the candidate cell;
   identifying whether the identification information for the candidate cell exists in a second list stored in the UE;
   in case that the identification information of the candidate cell received in the first list exists in the second list stored in the UE, replacing one conditional configuration of the candidate cell stored in the UE with a conditional configuration received for the identification information of the candidate cell received in the first list; and
   performing one or more operations for a conditional handover based on the RRC reconfiguration message.

2. The method of claim 1,
   wherein the first list further includes information on a condition for triggering an execution of the conditional configuration for the candidate cell,
   wherein the method further comprises, in case that the identification information of the candidate cell received in the first list exists in the second list stored in the UE, replacing one condition of the candidate cell in the second list stored in the UE with a condition received for the identification information of the candidate cell received in the first list; and
   wherein the performing of the one or more operations for the conditional handover comprises evaluating the condition received for the identification information of the candidate cell received in the first list.

3. The method of claim 1, wherein the performing of the one or more operations for the conditional handover comprises:
   based on identifying that a condition is met based on a measurement result, applying the conditional configuration.

4. The method of claim 1, further comprising:
   in case that the identification information for the candidate cell received in the first list does not exist in the second list stored in the UE, storing the conditional configuration received for the identification information of the candidate cell received in the first list.

5. The method of claim 1, further comprising:
receiving, from the base station, an RRC reconfiguration message including information on a release list including identification information for another candidate cell; and
in case that the identification information for another candidate cell exists in the second list stored in the UE, releasing a conditional configuration corresponding to the identification information for another candidate cell.

6. The method of claim 1,
wherein the RRC reconfiguration message includes an addition/modification list for the one or more conditional configuration information, and
wherein the addition/modification list includes the first list of the one or more conditional configuration information.

7. The method of claim 5, further comprising receiving a second RRC reconfiguration message for confirming completion of the conditional handover.

8. The method of claim 2, further comprising:
identifying at least one candidate cell satisfying the condition for triggering an execution of the conditional configuration for the candidate cell; and
in case that the at least one candidate cell is two or more, selecting one candidate cell among the at least one candidate cell; and
wherein the performing of the one or more operations for the conditional handover comprise performing the conditional handover from a serving cell to the one candidate cell.

9. A user equipment (UE) in a wireless communication system, comprising:
at least one transceiver; and
at least one processor configured to:
receive, from a base station via the at least one transceiver, a radio resource control (RRC) reconfiguration message including a first list of one or more conditional configuration information, wherein the first list of the one or more conditional configuration information includes:
identification information for a candidate cell; and
a conditional configuration for the candidate cell;
identify whether the identification information for the candidate cell exists in a second list stored in the UE;
in case that the identification information of the candidate cell received in the first list exists in the second list stored in the UE, replace one conditional configuration of the candidate cell stored in the UE with a conditional configuration received for the identification information of the candidate cell received in the first list; and
perform one or more operations for a conditional handover based on the RRC reconfiguration message.

10. The UE of claim 9,
wherein the first list further includes information on a condition for triggering an execution of the conditional configuration for the candidate cell,
wherein the at least one processor is further configure to, in case that the identification information of the candidate cell received in the first list exists in the second list stored in the UE, replace one condition of the candidate cell in the second list stored in the UE with a condition received for the identification information of the candidate cell received in the first list; and
wherein the at least one processor is configured to, in order to perform the one or more operations for the conditional handover, evaluate the condition for the identification information of the candidate cell received in the first list.

11. The UE of claim 9, wherein the at least one processor is, in order to perform the one or more operations for the conditional handover, configured to:
based on identifying that a condition is met based on a measurement result, apply the conditional configuration.

12. The UE of claim 9, wherein the at least one processor is further configured to:
in case that the identification information for the candidate cell received in the first list does not exist in the second list stored in the UE, store the conditional configuration received for the identification information of the candidate cell received in the first list.

13. The UE of claim 9, wherein the at least one processor is further configured to:
receive, from the base station via the at least one transceiver, an RRC reconfiguration message including information on a release list including identification information for another candidate cell; and
in case that the identification information for another candidate cell exists in the second list stored in the UE, release a conditional configuration corresponding to the identification information for another candidate cell.

14. The UE of claim 9,
wherein the RRC reconfiguration message includes an addition/modification list for the one or more conditional configuration information, and
wherein the addition/modification list includes the first list of the one or more conditional configuration information.

15. The UE of claim 13, wherein the at least one processor is further configured to receive a second RRC reconfiguration message for confirming completion of the conditional handover.

16. The UE of claim 10, wherein the at least one processor is further configured to:
identify at least one candidate cell satisfying the condition for triggering an execution of the conditional configuration for each candidate cell; and
in case that the at least one candidate cell is two or more, select one candidate cell among the at least one candidate cell; and
wherein the at least one processor is configured to, in order to perform the one or more operations for the conditional handover, perform the conditional handover from a serving cell to the one candidate cell.

* * * * *